(12) United States Patent
Shinpuku et al.

(10) Patent No.: US 11,848,443 B2
(45) Date of Patent: Dec. 19, 2023

(54) LITHIUM METAL COMPOSITE OXIDE POWDER WITH SUPPRESSED GAS GENERATION

(71) Applicant: Umicore, Brussels (BE)

(72) Inventors: Takashi Shinpuku, Olen (BE); Hiroshi Tani, Olen (BE); Ralph Otterstedt, Olen (BE); Keiichiro Kanao, Olen (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 16/495,895

(22) PCT Filed: Mar. 19, 2018

(86) PCT No.: PCT/EP2018/056864
§ 371 (c)(1),
(2) Date: Sep. 20, 2019

(87) PCT Pub. No.: WO2018/172272
PCT Pub. Date: Sep. 27, 2018

(65) Prior Publication Data
US 2020/0067089 A1    Feb. 27, 2020

(30) Foreign Application Priority Data

Mar. 24, 2017  (JP) .................. 2017-059631
Mar. 24, 2017  (JP) .................. 2017-059632
Mar. 24, 2017  (JP) .................. 2017-059633

(51) Int. Cl.
*H01M 4/525*    (2010.01)
*C01G 53/00*    (2006.01)
(Continued)

(52) U.S. Cl.
CPC .......... *H01M 4/525* (2013.01); *C01G 53/42* (2013.01); *H01M 10/0525* (2013.01);
(Continued)

(58) Field of Classification Search
CPC ............ H01M 4/525; H01M 10/0525; H01M 2004/028; H01M 4/131; C01G 53/42; C01P 2002/85; C01P 2006/40; Y02E 60/10
See application file for complete search history.

(56) References Cited

U.S. PATENT DOCUMENTS

2001/0036579 A1* 11/2001 Hosoya ................. H01M 4/485
429/231.95
2004/0265693 A1* 12/2004 Kurachi ................. C01G 53/42
429/231.1
(Continued)

FOREIGN PATENT DOCUMENTS

EP    1492177 A2    12/2004
EP    2698351 A1    2/2014
(Continued)

OTHER PUBLICATIONS

Belharouak, I. et al., "Safety characteristics of Li(Ni0.8Co0.15Al0.05)O2 and Li(Ni1/3Co1/3Mn1/3)O2" Electrochemistry Communications, Elsevier, Jan. 2006, vol. 8, pp. 329-335.
(Continued)

*Primary Examiner* — Andrew J. Oyer
(74) *Attorney, Agent, or Firm* — NK Patent Law

(57) ABSTRACT

To provide a positive electrode active material of a lithium ion battery which has a large discharge capacity, excellent cycle characteristics, and suppressed gas generation. Resolution Means: A lithium metal composite oxide powder for use in a positive electrode active material for a lithium ion battery, the powder thereof having a composition of $Li_aNi_bCo_cAl_dO_2$ (wherein, a=0.8 to 1.2, b=0.7 to 0.95, c=0.02 to 0.2, d=0.005 to 0.1, and b+c+d=1) treated with an aqueous solution of an organic metal salt and soluble aluminum salt, and not causing volume expansion due to gas generation.

4 Claims, 10 Drawing Sheets

(51) Int. Cl.
   *H01M 10/0525* (2010.01)
   *H01M 4/02* (2006.01)
(52) U.S. Cl.
   CPC ...... *C01P 2002/85* (2013.01); *C01P 2006/40* (2013.01); *H01M 2004/028* (2013.01)

(56) References Cited

U.S. PATENT DOCUMENTS

| | | | |
|---|---|---|---|
| 2011/0300470 A1 | 12/2011 | Olbrich et al. | |
| 2012/0107686 A1* | 5/2012 | Ryu | H01M 4/625 429/215 |
| 2015/0194662 A1* | 7/2015 | Yang | H01M 4/525 429/223 |
| 2015/0243970 A1 | 8/2015 | Choi et al. | |
| 2016/0072150 A1* | 3/2016 | Kim | H01M 10/0567 429/188 |
| 2018/0026298 A1 | 1/2018 | Hasegawa et al. | |

FOREIGN PATENT DOCUMENTS

| EP | 3024068 A1 | 5/2016 |
|---|---|---|
| JP | 2003017054 A | 1/2003 |
| JP | 2005019244 A | 1/2005 |
| JP | 2009176528 A | 8/2009 |
| JP | 5227306 B | 9/2009 |
| JP | 2009230863 A | 10/2009 |
| JP | 2012230898 A | 11/2012 |
| KR | 100602921 B1 | 7/2006 |
| KR | 2010-0102382 A | 9/2010 |
| WO | 2016136227 A1 | 9/2016 |

OTHER PUBLICATIONS

Seong-Min, B., et al., "Correlating Structural Changes and Gas Evolution during the Thermal Decomposition of Charged $Li_xNi_{0.8}Co_{0.15}Al_{0.05}O_2$ Cathode Materials" American Chemical Society, ACS Publications, Jan. 2013, vol. 25, pp. 337-351.

JPO; Office Action for Japanese Patent Application No. 2019-552139 dated Nov. 24, 2020, 6 pages.

KIPO; Office Action for Korean Patent Application No. 10-2019-7031372 dated Mar. 22, 2021, 12 pages.

ISA/EP; International Search Report and Written Opinion for International Patent Application No. PCT/EP2018/056864 dated Jun. 5, 2018, 8 pages.

* cited by examiner

LITHIUM METAL COMPOSITE OXIDE POWDER WITH SUPPRESSED GAS GENERATION

CROSS-REFERENCE TO RELATED APPLICATIONS

This application is a U.S. National Stage application of International Patent Application No. PCT/EP2018/056864, filed on Mar. 19, 2018, which claims the benefit of Japanese Patent Application No. 2017-059631, filed on Mar. 24, 2017; Japanese Patent Application No. 2017-059632, filed on Mar. 24, 2017; and Japanese Patent Application No. 2017-059633, filed on Mar. 24, 2017.

TECHNICAL FIELD

The present invention relates to a lithium metal composite oxide powder, along with a positive electrode using this powder for a lithium ion battery.

Lithium ion batteries have a long history, with the commercial production thereof started in the 1990s. However, the proliferation of mobile terminals, smartphones, electric automobiles, etc. since 2000 has led to the dramatic development of lithium ion batteries. Lithium ion batteries include a positive electrode, negative electrode, electrolyte, and exterior body as the main component members as with other batteries. Among others, the positive electrode active material used for the positive electrode is an important material influencing the battery performance of the lithium ion battery.

In order to achieve low cost and long term use of mobile terminals, smartphones, and electric automobiles, a positive electrode active material for a lithium ion battery having a high capacity has been proposed to date. In contrast, because safety and durability are also required for mobile terminals, smartphones, and electric automobiles for mounting lithium ion batteries, properties of not causing high heat resistance and deformation of the battery body, as well as excellent cycle characteristics of not deteriorating even upon repeated charging and discharging, are required for the positive electrode active material. In order to satisfy such requirements, various positive electrode active materials for lithium ion batteries have been proposed. To date, various positive electrode active materials such as those with a cobalt base exemplified by lithium cobaltate, iron phosphate having an olivine structure, lithium manganate having a spinel structure, lithium nickelate, and a ternary base of nickel-cobalt-manganese have been developed.

An electrode having a high energy density can be advantageously produced from an NCA based positive electrode active material using a composite oxide containing Li, Ni, Co, and Al among various positive electrode active materials. NCA based positive electrode active materials are significantly advantageous in exhibiting a high discharge capacity exceeding 190 mAh/g compared with a cobalt based positive electrode active material. Unfortunately, the problem with NCA based positive electrode active materials is that repeated charging and discharging generates gas in the battery. This problem is particularly serious in pouch cells or cells referred to as laminate cells obtained by laminating an electrode with a resin film, with a large amount of gas generation not only utilizing battery performance, but potentially also leading to safety problems such as deformation and rupture of the cells. The generation of oxygen gas or carbon dioxide gas from such an NCA based positive electrode active material is known to be closely associated with the fact that the structure of NCA based positive electrode active materials changes (phase changes) at high temperatures (Non-patent Document 1, Non-patent Document 2).

As a means for suppressing gas generation, for example, Patent Document 1 discloses a lithium composite oxide represented by the general equation $Li_xNi_yM_{1-y}O_2$ (wherein, M represents at least one of a transition metal, B, Al, Co, Cr, Ga, and In, $0.05 \leq x \leq 1.10$, $0.7 \leq y \leq 1.0$) which is washed with 500 mL or more of water per 100 g of this lithium composite oxide. Moreover, Patent Document 2 discloses a production method of a nonaqueous electrolyte secondary battery including a positive electrode containing a lithium nickel composite oxide after washing treatment as a positive electrode active material, a negative electrode, and a nonaqueous electrolyte, wherein the method includes: an active material washing treatment step of producing a lithium nickel composite oxide involving washing a nickel composite oxide having a specific surface area (S) of 0.2 to 1.0 m²/g, wherein the specific surface area (S') after washing is 0.5 to 3.0 m²/g, and the ratio (S'/S) of the specific surface area before/after washing is 1.5 to 4.0, and a nonaqueous electrolyte preparing step involving adding lithium fluoroborate and tert-amyl benzene to the above-mentioned nonaqueous electrolyte. Further, Patent Document 3 describes that a positive electrode active material is subjected to neutralization treatment using an acid solution having a pH of 3.0 to 6.0, after which the neutralization product is removed by washing. Unfortunately, with these methods, the capacity of the positive electrode active material after treatment is problematically reduced or sufficient cycle characteristics are not obtained.

Incidentally, a nickel based positive electrode active material is generally obtained by burning a mixture including a compound containing a nickel-cobalt composite hydroxide as a precursor along with a small amount of elements such as aluminum used as required, as well as a lithium compound. The performance of the nickel based positive electrode active material is known to be greatly related to properties such as the particle size distribution of the precursor used for burning. With this, various methods for producing a nickel-cobalt composite hydroxide effective as the precursor of a superior positive electrode active material have been proposed. For example, Patent Document 4 describes that a nickel-cobalt composite hydroxide having a spherical and regular particle shape is produced using a reactor having an inclined clarifier. The production method disclosed in Patent Document 4 is a highly versatile means for producing a composite hydroxide containing nickel and cobalt. Unfortunately, it is not adapted for optimization for the production of the precursor of an NCA based positive electrode active material which has recently attracted particular attention.

PRIOR ART DOCUMENTS—NON-PATENT DOCUMENTS

Non-patent Document 1: "Correlating Structural Changes and Gas Evolution during the Thermal Decomposition of Charged $LixNi_{0.8}Co_{0.15}Al_{0.05}O_2$ Cathode Materials" Seong-Min Bak et al., Chemistry of MATERIALS, 2013, 25, page 337-351

Non-patent Document 2: "Safety characteristics of $Li(Ni_{0.8}Co_{0.15}Al_{0.05})O_2$ and $Li(Ni_{1/3}Co_{1/3}Mn_{1/3})O_2$" I. Belharouak et al., Electrochemistry Communications 8 (2006) Page 329-335

PRIOR ART DOCUMENTS—PATENT DOCUMENTS

Patent Document 1: JP 2003-17054 A
Patent Document 2: JP 2009-176528 A
Patent Document 3: JP 2009-230863 A
Patent Document 4: JP 5227306 B

SUMMARY OF INVENTION

An object of the present invention is to provide a lithium nickel metal based positive electrode active material which has a large discharge capacity, favorable cycle characteristics, and suppressed gas generation. The present inventors found that a lithium metal composite oxide powder treated with an aqueous solution of an organic metal salt and preferably also a soluble aluminum salt is effective as a lithium ion battery positive electrode active material exhibiting little gas generation, high discharge capacity, and a high cycle retention rate. The same is valid for a lithium metal composite oxide powder treated with an aqueous solution of a thiosulfate, preferably sodium thiosulfate.

That is, the present invention may be described as follows.

A lithium metal composite oxide powder for use in a positive electrode active material for a lithium ion battery, the powder thereof having a composition of $Li_aNi_bCo_cAl_dO_2$ (wherein, a=0.8 to 1.2, b=0.7 to 0.95, c=0.02 to 0.2, d=0.005 to 0.1, and b+c+d=1) and treated with an aqueous solution of an organic metal salt and preferably a soluble aluminum salt, or with an aqueous solution of a thiosulfate, preferably sodium thiosulfate, wherein a laminate battery obtained by the following production method (1) using the lithium metal composite oxide powder as a positive electrode active material has a gas generation amount measured under a condition (2) below of less than 1.0 mL/g, (1) a method for producing a laminate battery,
wherein a mixture containing 1 part by weight of acetylene black, 5 parts by weight of graphite carbon, and 4 parts by weight of polyvinylidene fluoride per 100 parts by weight of the lithium metal composite oxide powder is dispersed in N-methyl pyrrolidone, which is a dispersion solvent, to prepare a positive electrode agent slurry, the positive electrode agent slurry thereof is then coated onto an aluminum foil, which is a current collector, then dried and pressed to produce a positive electrode,
98 parts by weight of artificial graphite, 1 part by weight of carboxymethyl cellulose as a binder, and 1 part by weight of a styrene butadiene copolymer are mixed with water as a dispersion medium to obtain a negative electrode mixed agent, the negative electrode mixed agent is then coated onto a copper foil, which is a current collector, and dried to produce a negative electrode,
ethylene carbonate (EC) in which $LiPF_6$ is dissolved at a concentration of 1 mol/L, ethyl methyl carbonate (EMC), and vinyl carbonate (VC) are mixed to a weight ratio (EC:EMC:VC) of 50:50:1, thereby producing an electrolytic solution, and the abovementioned positive electrode, negative electrode, and electrolytic solution are laminated and sealed to produce a laminate battery; and (2) a method for measuring the gas generation amount, wherein the laminate battery is charged to 4.2 V at a rate of 0.1 C, after which the volume $(V_0)$ (mL) thereof is measured using the Archimedes method, the laminate battery is then stored in a thermostatic tank for 72 hours at 85° C., after which the volume $(V_{85-72})$ (mL) thereof is once again measured using the Archimedes method, and the measured volumes $V_0$ and $V_{85-72}$, as well as the weight (g) of the lithium metal composite oxide powder used in the laminate battery are then used to calculate the gas generation amount (mL/g) of the laminate battery as defined by the following equation.

$$\text{Laminate battery gas generation amount (mL/g)} = \frac{V_{85-72} - V_0}{\text{Weight (g) of the lithium metal composite oxide powder}}$$

The lithium metal composite oxide powder for use in a positive electrode active material for a lithium ion battery according to Invention 1, wherein, furthermore, a coin battery obtained by a production method (3) below using the lithium metal composite oxide powder as a positive electrode active material has an initial discharge capacity measured by a method (4) below of 190 mAh/g or larger, and the cycle retention rate of the coin battery measured by a method (5) below is 95% or higher, (3) a method for producing a coin battery,
wherein a mixture containing 1 part by weight of acetylene black, 5 parts by weight of graphite carbon, and 4 parts by weight of polyvinylidene fluoride per 100 parts by weight of the lithium metal composite oxide powder is dispersed in N-methyl pyrrolidone, which is a dispersion solvent, to prepare a positive electrode agent slurry, the positive electrode agent slurry thereof is then coated onto an aluminum foil, which is a current collector, then dried and pressed to produce a positive electrode, the positive electrode, a negative electrode comprising a lithium metal foil, and an electrolytic solution comprising a solution of a mixture of equal amounts of ethylene carbonate with 1 mol/L of $LiPF_6$ and ethyl methyl carbonate are used to fabricate a CR2032 type coin battery in accordance with the standards of the International Electrotechnical Commission (IEC);

(4) a method for measuring the initial discharge capacity, wherein the battery capacity of the coin battery per weight of the positive electrode active material when the battery is discharged at 0.1 C between 4.3 V and 3.0 V is measured as the initial discharge capacity (Ah/g); and (5) a method for measuring the cycle retention rate, wherein, after the initial discharge capacity is measured, the coin battery is then subjected to 50 cycles of repeated charging and discharging, with one cycle being charging of 0.5 C and discharging of 1.0 C in a 25° C. environment, and the cycle retention rate (%) of the coin battery as defined by the following equation is then determined using the battery capacity (01) (mAh/g) after completing one cycle and the battery capacity (050) (mAh/g) after completing 50 cycles per weight of the positive electrode active material.

$$\text{Coin battery cycle retention rate (\%)} = \frac{Q50}{Q1} \times 100$$

The lithium metal composite oxide powder for use in a positive electrode active material for a lithium ion battery according to Invention 1 or 2, wherein the organic metal salt is sodium dodecyl sulfate.

The lithium metal composite oxide powder for use in a positive electrode active material for a lithium ion battery according to any one of Inventions 1 to 3, wherein the soluble aluminum salt is aluminum sulfate.

The lithium metal composite oxide powder for use in a positive electrode active material for a lithium ion battery according to any one of Inventions 1 to 4, wherein aluminum agglomeration is not observed by energy dispersion type X-ray analysis.

A lithium ion battery having a positive electrode active material containing the lithium metal composite oxide powder according to any one of Inventions 1 to 5.

The present invention provides a lithium nickel metal based positive electrode active material which has a large discharge capacity, excellent cycle characteristics, and suppressed gas generation, along with a lithium ion battery using this material.

Alternatively the present invention may be described as follows:

A lithium metal composite oxide powder for use in a positive electrode active material for a lithium ion battery, the powder having a composition of $Li_aNi_bCo_cAl_dO_2$, whereby a=0.8 to 1.2, b=0.7 to 0.95, c=0.02 to 0.2, d=0.005 to 0.1, and b+c+d=1, the powder having been treated with an aqueous solution of an organic metal salt and preferably having been treated with an aqueous solution of a water-soluble aluminum salt or having been treated with an aqueous solution of a thiosulfate.

Preferably the powder additionally has undergone drying after having been treated with the aqueous solution of an organic metal salt or a thiosulfate, whereby the drying was performed at a temperature between 200° C. and 800° C., and preferably between 300° C. and 700° C., whereby preferably the drying was performed in an oxidizing gas atmosphere.

The invention further comprises a method for preparing a lithium metal composite oxide powder for use in a positive electrode active material for a lithium ion battery, whereby in a first step a preliminary lithium metal composite oxide powder having a composition of $Li_aNi_bCo_cAl_dO_2$, whereby a=0.8 to 1.2, b=0.7 to 0.95, c=0.02 to 0.2, d=0.005 to 0.1, and b+c+d=1 is prepared, whereby in a second step said preliminary lithium metal composite oxide powder is treated with an aqueous solution of an organic metal salt and preferably with an aqueous solution of a water-soluble aluminum salt or whereby in a second step said preliminary lithium metal composite oxide powder is treated with an aqueous solution of a thiosulfate.

Preferably in a third step taking place after the second step the treated preliminary lithium metal composite oxide powder is dried at a temperature between 200° C. and 800° C., and preferably between 300° C. and 700° C., whereby more preferably the drying was performed in an oxidizing gas atmosphere.

Preferably the water-soluble aluminum salt is aluminum sulfate.

Preferably the organic metal salt is a metal acetate or has at least three carbon atoms per metal atom and more preferably the organic metal salt has at least five carbon atoms per metal atom.

Preferably the organic metal salt is sodium dodecyl sulfate.

MODE FOR CARRYING OUT INVENTION

Figure 1:
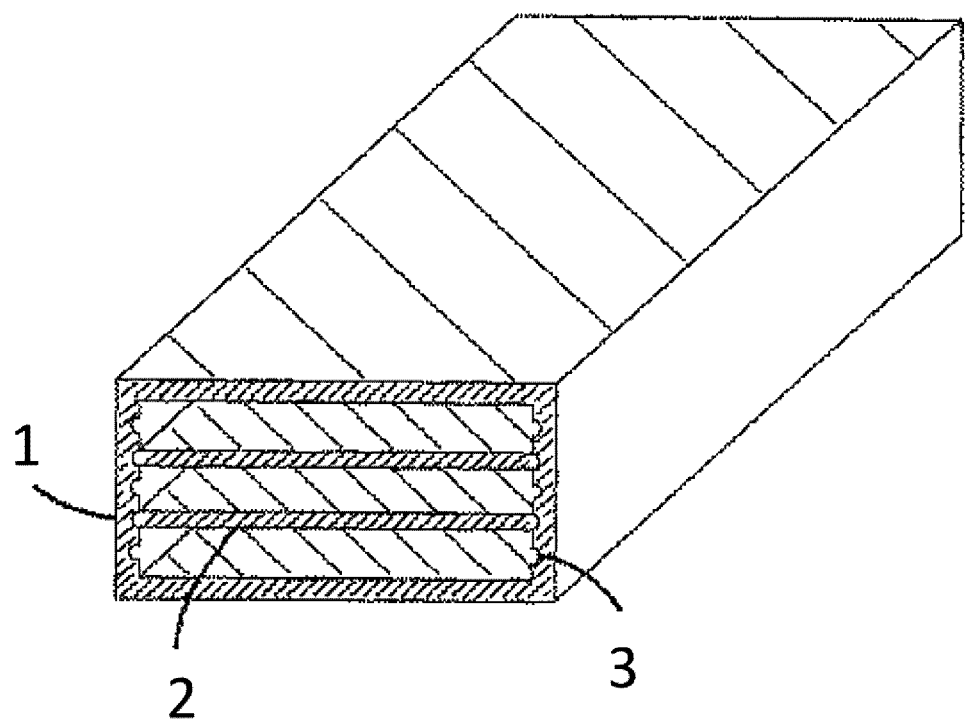
FIG. 1 schematically illustrates an example of an inclined plate sedimentation apparatus or clarifier which can be used in the production of the present invention.

The lithium metal composite oxide powder of the present invention is obtained by firing or burning a substance obtained by mixing an aluminum compound and a lithium compound in a nickel-cobalt composite hydroxide serving as a precursor, or a burning substance obtained by mixing a nickel-cobalt-aluminum composite hydroxide serving as a precursor and a lithium compound, then treating the burned substance with the specified aqueous solution. Hereinafter, the production method thereof will be described in detail.

1. Production of Precursor

A step of producing a nickel-cobalt composite hydroxide serving as the precursor of a lithium metal composite oxide by a coprecipitation method, the oxide having a composition of $Li_aNi_bCo_cAl_dO_2$ (wherein, a=0.8 to 1.2, b=0.7 to 0.95, c=0.02 to 0.2, d=0.005 to 0.1, and b+c+d=1).

(1-1 Raw material preparation) In the present invention, nickel sulfate as a nickel raw material, as well as cobalt sulfate as a cobalt raw material, are used. Nickel sulfate and cobalt sulfate are prepared as a mixed aqueous solution in advance and supplied to a reactor. The nickel sulfate concentration in the mixed aqueous solution liquid is preferably adjusted to 15 wt. % or higher and 30 wt. % or lower, further preferably 20 wt. % or higher and 25 wt. % or lower. The cobalt sulfate concentration in the mixed aqueous solution liquid is adjusted to 15 wt. % or higher, 25 wt. % or lower, further preferably 18 wt. % or higher and 23 wt. % or lower. In the coprecipitation reaction, besides these, a sodium hydroxide aqueous solution as an alkaline regulator, as well as ammonia water as a complexing agent, are supplied. These are supplied to the reactor via a passage different from that of the mixed aqueous solution of nickel sulfate and cobalt sulfate.

(1-2 Precipitation step) The mixed aqueous solution of nickel sulfate and cobalt sulfate, an alkaline regulator, and a complexing agent are supplied to the reactor to produce a nickel-cobalt composite hydroxide (hereinafter, "composite hydroxide") as a coprecipitate. The pH of the aqueous solution in the reactor is controlled within a range appropriate for the coprecipitation reaction, generally within the range of 7 to 14, and preferably within the range of 9 to 12. The temperature of the reaction liquid is not limited as long as it is a temperature at which the composite hydroxide is produced; however, it is generally 40° C. or higher from the perspective of the range of the average particle diameter obtained from the produced particles. While the shape and material of the reactor body is not particularly limited, a stainless container having a so-called tank shape can be used without limitation. In a case where the temperature of the reaction liquid is high, the solubility of metal components in water increases and fine particles vanish, resulting in the promotion of particle growth of the composite hydroxide, as well as the production of a composite hydroxide having a relatively large particle diameter. In a case where the temperature of the reaction liquid is low, a composite hydroxide having a relatively small particle diameter is produced.

A stirring means is provided inside the reactor. The stirring means is not particularly limited. In a case where the stirring means is a motor with the number of revolutions controlled using a stirring blade, various shapes such as a propeller, paddle, flat paddle, turbine, cone, screw, and ribbon can be used. By controlling the stirring power, the particle size of the composite hydroxide can be adjusted. In a case where the stirring power is high, the average particle diameter of the composite hydroxide decreases; in contrast, if the stirring power is low, the average particle diameter of the composite hydroxide increases.

An extraction port for a produced composite hydroxide slurry is provided in the reactor. The position of the extraction port may be any position from the top to the bottom of the reactor. A tube for conducting the slurry outside the reactor, along with a pump coupled to this tube, is coupled to the extraction port. Once the precipitation reaction reaches a steady state, the nickel-cobalt composite hydroxide slurry is extracted from the reactor at a fixed flow rate via the pump and transferred to the following drying step.

An apparatus (separation apparatus) for separating the composite hydroxide slurry into a solid fraction and a liquid fraction is coupled to the reactor. A centrifugal separation apparatus, filter, etc. is used as a separation mechanism. Using the pump and a suction pipe, a fixed amount of the composite hydroxide slurry is sucked from the reactor and delivered to the separation mechanism. In the separation mechanism, the composite hydroxide slurry is separated into a solid fraction containing particles of the nickel-cobalt composite hydroxide, as well as a liquid fraction containing the aqueous solution and fine particles of the nickel-cobalt composite hydroxide. Part of the separated liquid fraction is discharged outside the reactor, while the remaining liquid fraction and solid fraction are returned into the reactor. As thus described, the slurry is circulated inside and outside the reactor via the separation mechanism. The concentration of the composite hydroxide in the reactor can be controlled by the circulation of such a slurry. In a case where the solid concentration of the slurry in the reactor is controlled so as to be 50 g/L or higher, there is no problem with production efficiency. By removing solid particles having an average particle diameter within a fixed range using the separation mechanism, the average particle diameter of the obtained composite hydroxide can be controlled.

In the precipitation step, the composite hydroxide needs to be produced as a solid of the solid particle diameter having a size close to the particles of the lithium metal composite oxide according to the present invention. That is, in the precipitation step, the temperature, stirring strength, and slurry concentration of the reaction liquid are adjusted to produce a composite hydroxide with the average particle diameter controlled so as to be 1 μm or larger and 10 μm or smaller, preferably 2 μm or larger and 8 μm or smaller.

(1-3 Reaction apparatus) Such a composite hydroxide slurry is efficiently sucked, separated, and circulated using the inclined clarifier disclosed in JP 5227306 B. The inclined clarifier or plate sedimentation apparatus is used in an apparatus and method for producing a compound by precipitating the solid from a solution. Using a precipitation apparatus including the inclined plate sedimentation apparatus, the physical and chemical properties of the particles of the solid formed during the precipitation can be each independently adjusted so as to be very flexible, allowing the production of a tailor-made product at a very high space time thru put.

The inclined plate sedimentation apparatus is a reactor/filter system (IRKS) which is connected to the reactor with the composite hydroxide produced therein, and separates, from the slurry in the reactor, the solid fraction and the liquid fraction containing the aqueous solution and fine particles, with part of the slurry capable of being returned to the reactor. The use of IRKS including the inclined plate sedimentation apparatus removes the product slurry containing a product and mother liquid following precipitation of the compound, as well as the mother liquid and fine particles via the inclined plate sedimentation apparatus, thereby increasing the solid concentration of the slurry.

An opening may be provided in the reactor and via this opening, the slurry can be extracted using the pump or by overflowing, then returned into the reactor using the pump. In order to obtain a homogeneous precipitated product, it is important that the starting material be favorably mixed when thrown into the reactor. This reactor can also be operated as a stirring reactor. In the precipitation process in IRKS with the inclined plate sedimentation apparatus installed therein, the temperature can be adjusted in accordance with the object substance. The process temperature in IRKS is controlled by heating or cooling via a heat exchanger as required.

Figure 2:
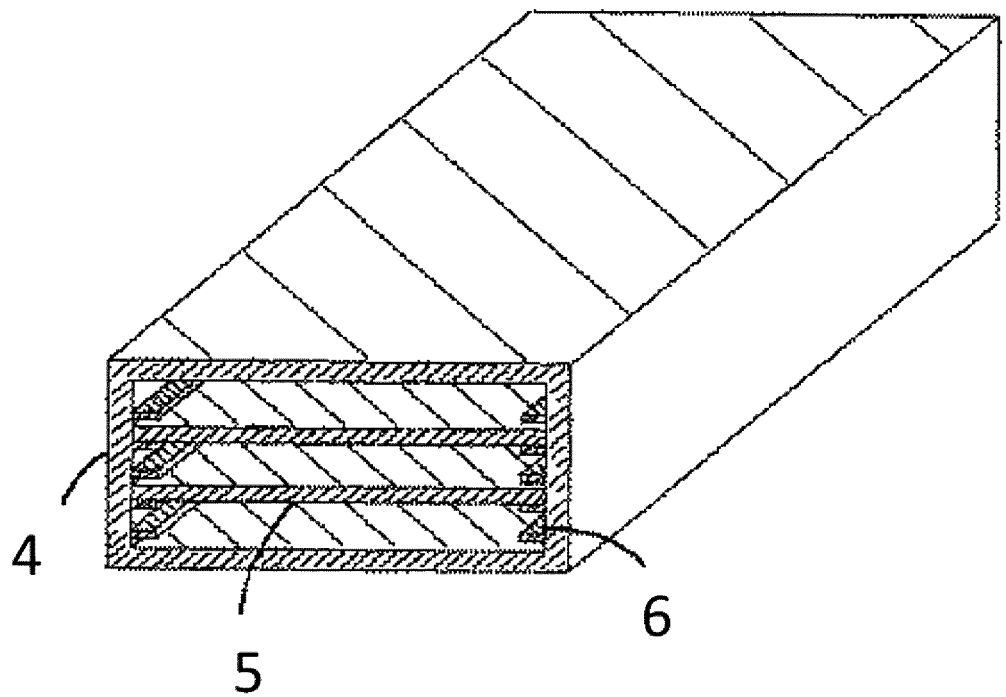
FIG. 2 schematically illustrates an example of an inclined plate sedimentation apparatus which can be used in the production of the present invention.

In order to enhance the separation performance of the inclined plate sedimentation apparatus, one or more lamellae can be attached, with the solid particles thereon reaching the surface of the lamellae by the sedimentation of these particles, then sliding below the lamellae, and returning into the sliding reaction slurry. The lamellae provided in the inclined plate sedimentation apparatus are schematically illustrated in FIGS. 1 and 2.

The lamellae (2, 5) are disposed on the plane parallel to the floor face in inclined plate sedimentation apparatuses (1, 4). The lamellae are rectangular plates which may contain plastics, glass, wood, metal, or ceramics. The thickness of the lamellae (2, 5) may be up to 10 cm in accordance with the material and product. Lamellae having a thickness of preferably 0.5 cm to 5 cm, particularly preferably 0.5 cm to 1.5 cm are used. The lamellae (2, 5) are fixed and attached to the inclined plate sedimentation apparatuses (1, 4). These may be removable. In this case, these are made to enter the inclined plate sedimentation apparatuses (1, 4) via a rail system (6) or grooves (3) attached on the side faces inside the inclined plate sedimentation apparatuses (1, 4). The height of the rail system (6) may be set so as to be adjustable, such that great flexibility regarding the selection of the interval of the lamellae (2, 5) is imparted to the inclined plate sedimentation apparatuses (1, 4). The inclined plate sedimentation apparatus may be configured in a cylindrical shape having a round cross section or a parallelepiped shape having a quadrangular cross section. In order that the sliding of particles functions without blocking the inclined plate sedimentation apparatus, the angle of the inclined plate sedimentation apparatus is 20° to 85°, preferably 40° to 70°, and particularly preferably 50° to 60° with respect to the horizontal plane. The inclined plate sedimentation apparatus may be attached to the reactor via a flexible coupling part. In this embodiment, the angle can be adjusted so as to be variable in the process.

Figure 3:
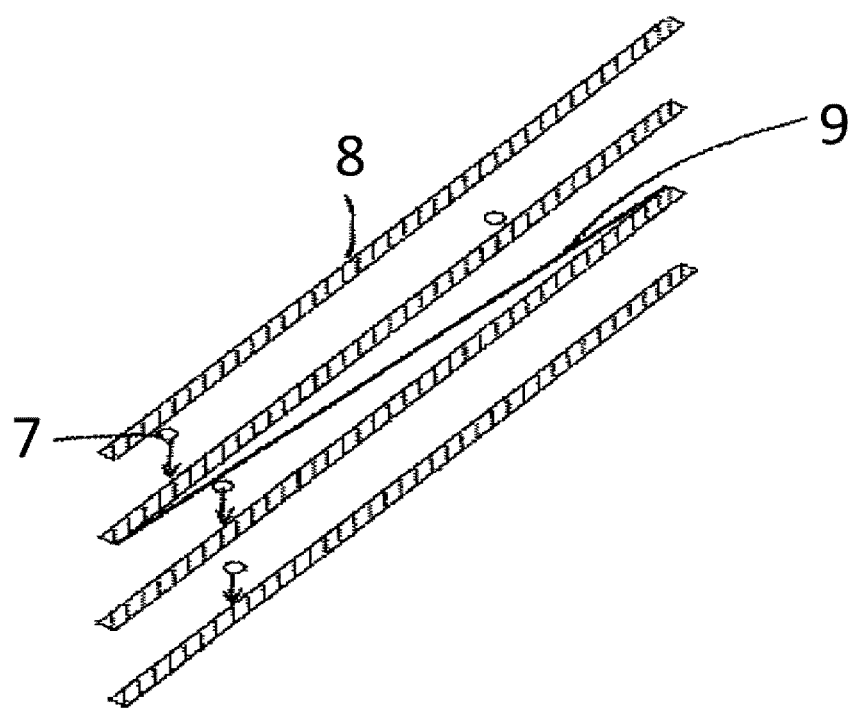
FIG. 3 is a schematic view for understanding the function of the inclined plate sedimentation apparatus which can be used for the production of the present invention.

In order to better understand the functional style of IRKS due to the inclined plate sedimentation apparatus, it will be described hereinafter in detail based on FIG. 3. Solid particles (7) are sedimented downward at a fixed speed in the inclined plate sedimentation apparatus in accordance with the shape and size thereof. For example, based on the Stokes friction, the sedimentation speed of spherical particles due to the effective gravity is proportional to the square of the particle diameter. This speed overlaps the superior component of the speed of the laminar flow in the inclined plate sedimentation apparatus. All solid particles having a sedimentation speed lower than or equal to the superior component of the liquid flow cannot be sedimented to the surface of a lamella (8) or the floor face of the inclined plate sedimentation apparatus, and are finally discharged in the overflow of the inclined plate sedimentation apparatus.

In a case where the sedimentation speed of particles is higher than that of the superior component of the liquid flow, it generates a downward motion of particles at a fixed sedimentation speed. Whether particles are thus discharged from the inclined plate sedimentation apparatus with the fluid flow depends on the interval between the particles and the lamellae in the vertical direction upon entering the inclined plate sedimentation apparatus at a fixed flow rate of the liquid, along with the length and inclination angle of the inclined plate sedimentation apparatus. Because the presence of critical particle radius r0 is easily recognized, all particles having r>r0 are completely retained using the inclined plate sedimentation apparatus. The straight line (9) in FIG. 3 indicates the locus of particles having the critical radius r0. The locus of all particles having higher radii has a smaller angle with respect to the horizontal plane, ensuring the particles assuredly collide on the lamellae or floor plate. This means that these particles are retained. By adjusting the ratio in the inclined plate sedimentation apparatus, particularly the flow rate of the liquid, the upper limit of the particle diameter of fine particles removed from the inclined plate sedimentation apparatus in the overflow can be adjusted.

As long as the overflow of the inclined plate sedimentation apparatus is returned into the stirring reactor via a circulation container, there is no change in any of the systems. In a case where part of a diluted slurry containing fine particles is extracted from the circulation container using the pump, part of the set fine particles can be discharged, while the particle size distribution can be directly controlled. As a result, the particle size and particle size distribution can be controlled so as to be independent of other plant parameters.

By extracting a diluted slurry with a solid concentration upon entering the circulation container of usually 0.5 to 5% per solid concentration in the reactor, the solid concentration of the slurry in the reactor is naturally simultaneously increased. That is, this is because the fine particle content is extracted, while the mother liquid is extracted. This is usually desirable. However, in a case where the solid concentration in the reactor should be maintained at a low level and adjustment of the flow of other materials cannot sufficiently cancel the increase in solid concentration, it is not desirable. In accordance with the amount and specification, this fine particle content can be subsequently mixed with the product slurry again. Separation in the reactor-filter-system is decisive.

In this case, in order to increase the solid concentration of the slurry, it is presumable that the mother liquid is extracted from the circulation container via a filter element and the pump is directly returned into the reactor. Upon discharging the same amount of fine particles, a smaller amount of the mother liquid is removed. In this case, particles with a particle diameter not exceeding 30% of the D50 value of the particle size distribution are referred to as fine particles. The mother liquid may be advantageously extracted via the filter element from the abovementioned system in the circulation container. As a result, first, the solid content in the reactor can be increased to several fold the stoichiometric solid concentration, and second, the concentration of a neutral salt generated in the precipitation reaction can be separated from the solid concentration in some cases. The concentration ratio of solid to salt in the reactor can be increased in accordance with the possibility of extracting the mother liquid, for example, not only by increasing the solid concentration at a fixed salt concentration, but also by the addition of a salt free solvent into the reactor at a fixed solid concentration, along with simultaneous extraction of the mother liquid in equal amounts from the abovementioned system via the filter element.

The increase in the flexibility of IRKS using the inclined plate sedimentation apparatus and simultaneous additional achievement of a degree of freedom will be described in further detail regarding the general reaction AX+BY→AY solid +BX dissolution with reference to an example of both the parameter salt concentration and the solid content. AX and BY represent the starting materials in a starting material solution, while BX represents the salt dissolved in the mother liquid. AY represents a product generated as an insoluble solid. IRKS using the inclined plate sedimentation apparatus can be used for precipitation carried out in a batch type. However, preferably, this IRKS is suitably used in the precipitation process in a continuous type operation.

The inclined plate sedimentation apparatus further relates to a production method of a compound by precipitation; wherein, in the method, individual process parameters (for example, the concentration of the starting material, the solid content in the slurry, and the salt concentration in the mother liquid) are each independently adjusted during precipitation, the particle size distribution in the precipitation process is thus controlled, and a tailor made product having conclusively defined physical properties is produced particularly economically and at a very high space time yield.

The object of the inclined plate sedimentation apparatus is therefore a production method of the compound using precipitation including the following steps:
  a step of preparing at least the first, second, and third starting material solutions;
  a step of mixing at least the first, second, and third starting material solutions in the reactor;
  a step of generating a reaction zone to be homogeneously mixed in the reactor;
  a step of precipitating the compound in the reaction zone to produce a product slurry containing an insoluble product and the mother liquid;
  a step of partially separating the mother liquid from a precipitated product via the inclined plate sedimentation apparatus;
  a step of producing a precipitated product slurry with the concentration of the precipitated product higher than the stoichiometric concentration;
  a step of extracting the product slurry from the reactor; and
  a step of filtrating, washing, and drying the precipitated product.

The starting material solution by the method using the inclined plate sedimentation apparatus is conducted into the reactor using a pump system. In a case where this is IRKS using the inclined plate sedimentation apparatus including the stirring reactor, the starting material is mixed using a stirrer. In a case where IRKS is designed in the shape of a jet type reactor, the starting material is mixed by a jet ejected from a nozzle. In order to achieve further favorable mixing of the starting material, air or inert gas may also be additionally conducted into the reactor. While the starting material is being mixed or homogenized, the precipitation reaction in which the product and the mother liquid are generated starts. The concentration of the product slurry is increased to the desired concentration in the lower part of the reactor. In order to achieve the intended high concentration of the product slurry, the mother liquid is partially removed via the inclined plate sedimentation apparatus by a method using the inclined plate sedimentation apparatus. Preferably, the overflow of the inclined plate sedimentation apparatus is extracted to partially separate the mother liquid using the pump.

In accordance with the method using the inclined plate sedimentation apparatus, a concentration of the precipitated product slurry which may be several fold the stoichiometrically possible concentration of the precipitated product is achieved. This can be increased up to 20 fold the stoichiometrically possible value. In order to achieve a particularly high product concentration in the slurry, a large amount of the mother liquid must be partially removed. Actually, up to 95% of the mother liquid can be partially separated. The amount of mother liquid to be partially separated depends on the selected process parameter, for example, the starting material concentration, the salt concentration of the mother liquid, and the solid concentration of the slurry.

Figure 4:
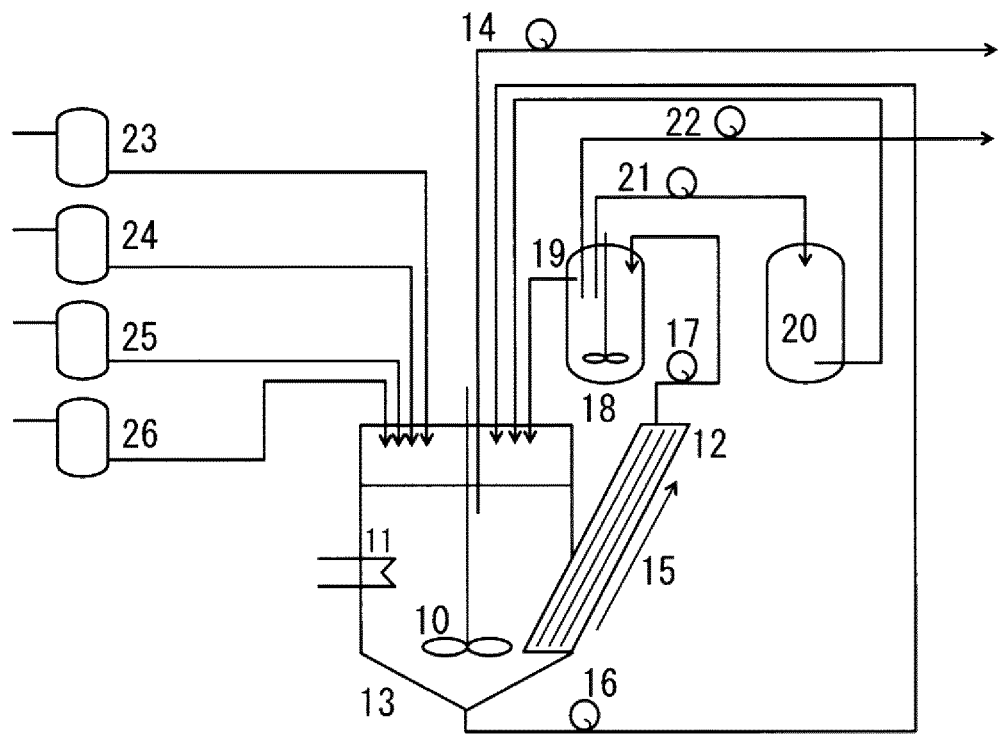
FIG. 4 schematically illustrates a reactor which can be used in the production of the present invention, along with the attachment apparatus thereof.
Figure 5:
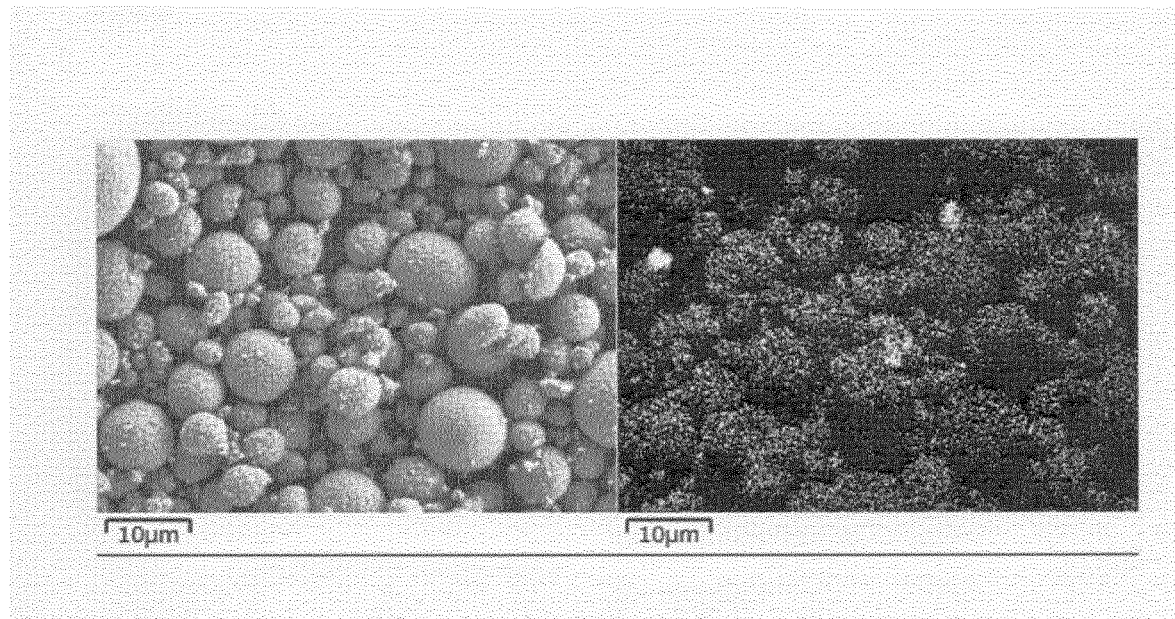
FIG. 5 is an electron microscope image (left) and aluminum energy dispersion type X-ray analysis (EDX) image (right) regarding one example (Example 1a) of a lithium metal composite oxide powder according to the present invention. Aluminum atoms are present in bright portions on the right side.
Figure 6:
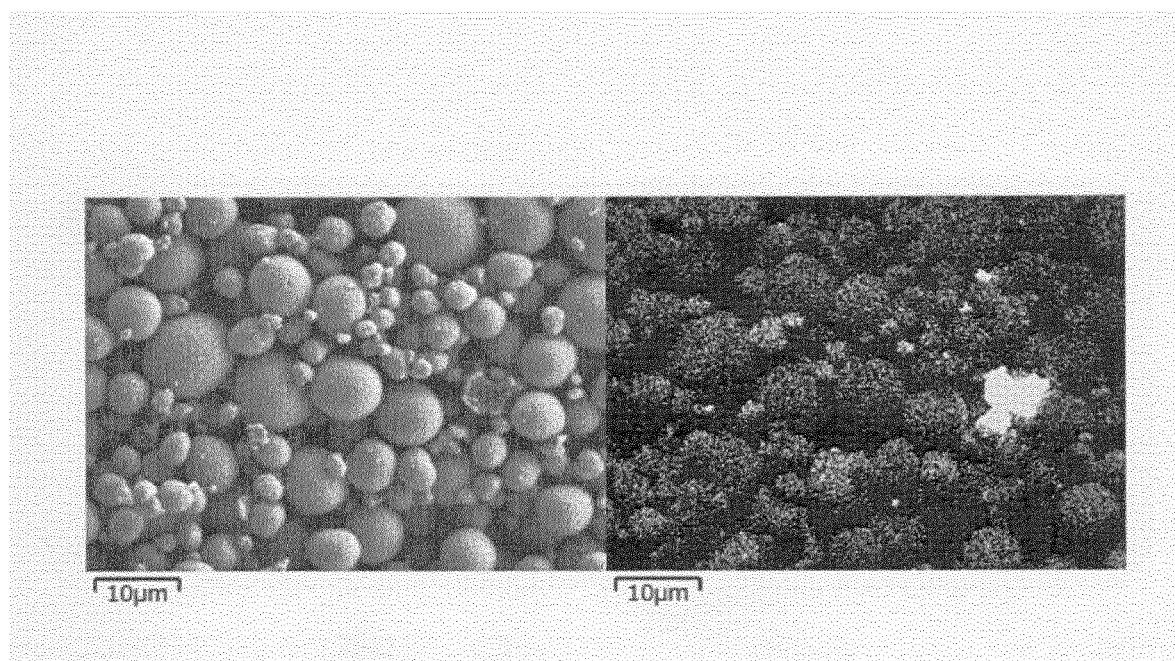
FIG. 6 is an electron microscope image (left) and aluminum energy dispersion type X-ray analysis image (right) regarding one example (Example 2a) of a lithium metal composite oxide powder according to the present invention. Aluminum atoms are present in bright portions on the right side.
Figure 7:
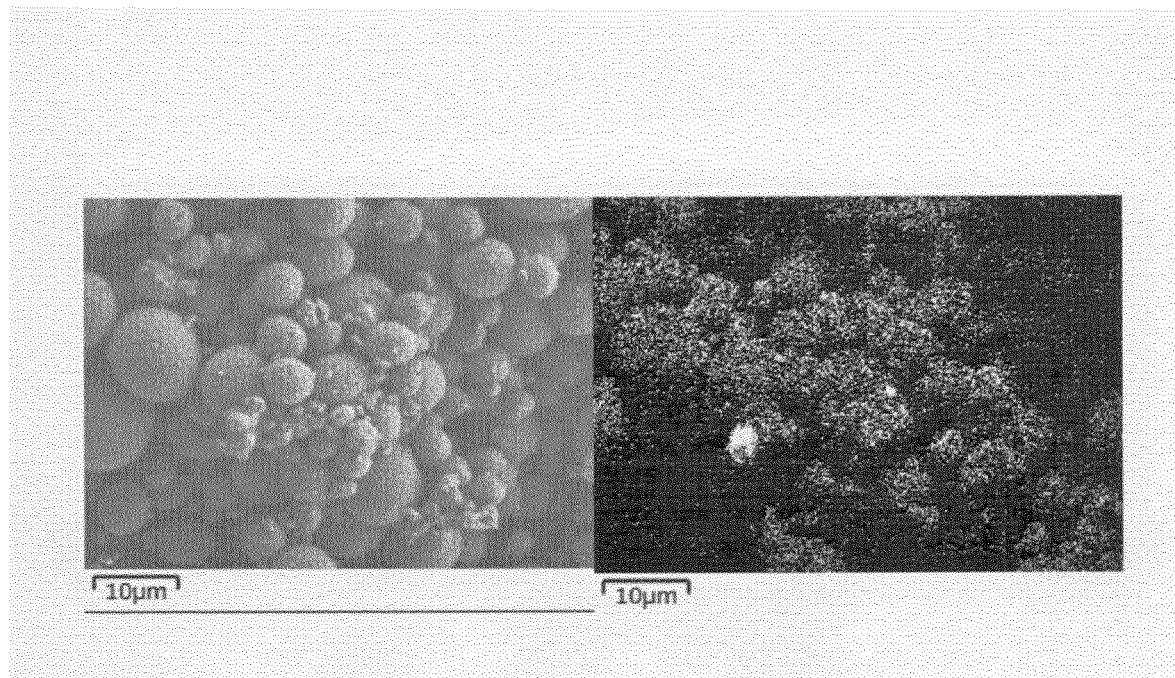
FIG. 7 is an electron microscope image (left) and aluminum energy dispersion type X-ray analysis image (right) regarding one example (Example 3a) of a lithium metal composite oxide powder according to the present invention. Aluminum atoms are present in bright portions on the right side.
Figure 8:
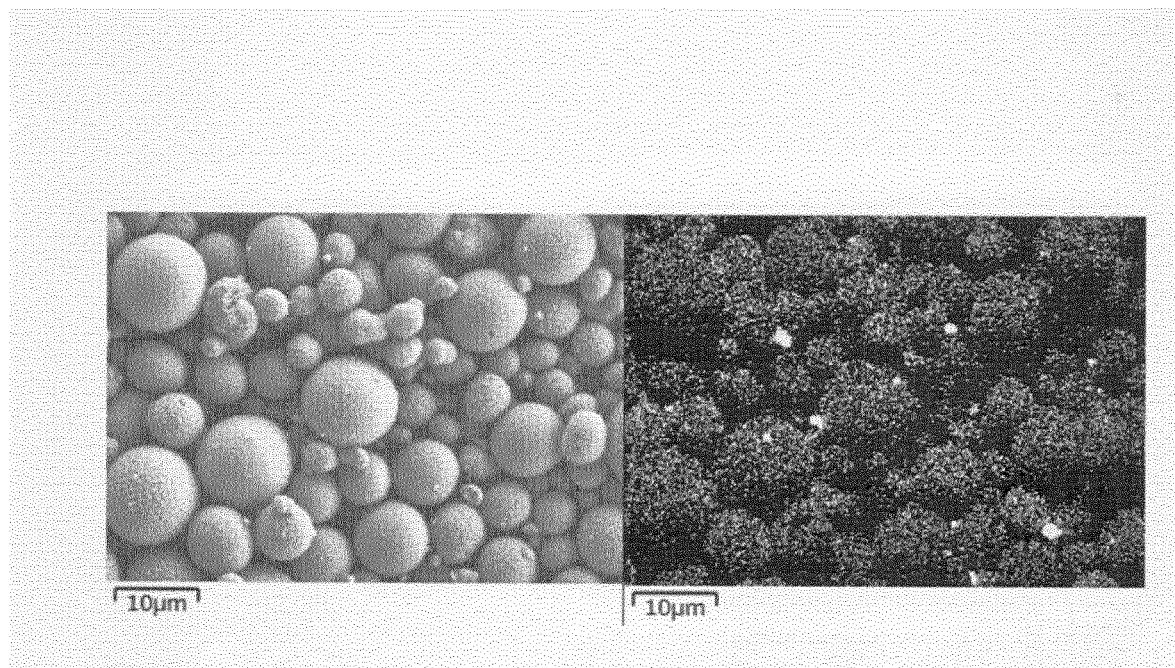
FIG. 8 is an electron microscope image (left) and aluminum energy dispersion type X-ray analysis image (right) regarding one example (Example 4a) of a lithium metal composite oxide powder according to the present invention. Aluminum atoms are present in bright portions on the right side.

In the precipitation step according to the present invention, such an inclined plate sedimentation apparatus can be coupled to the reactor as schematically illustrated in FIG. 4 to produce the composite hydroxide.

A supply path including independent pipes and pumps (23) to (26) is connected to a reactor (13) including a paddle blade (10) as a stirring apparatus capable of controlling the number of revolutions, a heat exchanger (11), and an inclined plate sedimentation apparatus (12). A mixed aqueous solution (metal aqueous solution) of nickel sulfate and cobalt sulfate, an alkaline regulator (sodium hydroxide aqueous solution), a complexing agent (ammonia water), and pure water are continuously conveyed from each of the pumps (23) to (26) into the reaction zone of an integral type reactor filter (IRKS). The slurry generated in the reactor (13) is extracted via a liquid level adjustment apparatus using a pump (14). In order to prevent the possibility of sedimentation upon producing large particles, a circulation pump (16) may be advantageously operated.

A pump (17) can convey a slurry having a very low concentration of fine particles into a circulation container (18) including a stirrer, then return it therefrom into the reactor (13). Only particles smaller than the separation size depending on the volume flow rate of the liquid along with dimensioning of the inclined plate sedimentation apparatus are conveyed into the circulation container (18). As long as all muddy flows extracted using the pump (17) are returned via a slurry flow (19), there is no change in the reactor (13).

By extracting the clear mother liquid from the circulation container (18) and conveying this into a second circulation container (20), the mother liquid and/or the solid particles can also be extracted from the abovementioned system. A pump (21) extracts the clear mother liquid from a first circulation container (18) and conveys this into the second circulation container (20). The pH value of the solution in the second circulation container (20), etc. can be continuously analyzed to control the composition of the mother liquid in the overall coprecipitation reactor. Moreover, by discharging the clear mother liquid via a pump (22) accumulated in the first circulation container (18), a precipitate of very fine particles contained in the clear mother liquid can be removed from the precipitation reactor.

Upon producing a precursor providing particles of the lithium metal composite oxide according to the present invention using such an inclined plate sedimentation apparatus, the temperature of the reaction liquid is controlled to 40° C. to 70° C., preferably 45° C. to 65° C., the number of revolutions of the paddle blade is controlled to 450 rpm to 1000 rpm, preferably 500 rpm to 800 rpm, and the slurry concentration is controlled to 100 g/L or higher, preferably 100 g/L to 400 g/L.

(1-4 Separation/drying of the composite hydroxide) Once the raw material in the target amount finishes reacting in the reactor, the slurry is extracted from a discharge port of the reactor and filtrated. A solid fraction containing the composite hydroxide is thus separated. Further, the solid fraction is washed. Washing may be carried out in accordance with an ordinary method and is carried out until the sulfate acid and alkaline components contained in the composite hydroxide are sufficiently removed using an alkaline aqueous solution and pure water. The composite hydroxide containing moisture is thus separated.

Subsequently, the separated composite hydroxide containing moisture is dried. The drying method may be any of hot air drying, infrared drying, high frequency drying, vacuum drying, etc. under atmospheric pressure. Vacuum drying capable of drying for a short period of time is preferable. The moisture in the composite hydroxide is dried until reaching approximately 1 wt. %. The nickel-cobalt composite hydroxide powder (precursor powder) is thus obtained as a precursor.

2. Burning

A compound including a lithium raw material along with a small amount of element M1 is added to the precursor powder and burned in the presence of oxygen. Aluminum hydroxide is common as an aluminum raw material. As the lithium raw material, lithium hydroxide powder or lithium carbonate powder is common. The precursor powder, aluminum raw material, and lithium raw material are mixed at a ratio such that each element ratio of Li, Ni, Co, and Al contained in these raw materials satisfies the composition of $Li_aNi_bCo_cAl_dO_2$ (a=0.8 to 1.2, b=0.7 to 0.95, c=0.02 to 0.2, d=0.005 to 0.1, and b+c+d=1). Mixing is carried out under shear force using various mixers. While not limited thereto, the burning furnace used during burning is preferably a tube furnace, muffle furnace, RK (rotary kiln), RHK (roller hearth kiln), etc. RHK is a particularly preferable burning furnace.

Burning can be carried out multiple times. Every time, burning is maintained at the highest temperature for 2 to 30 hours to complete the reaction. In order to obtain particles of the lithium metal composite oxide according to the present invention, burning is carried out such that the burning temperature is within the range of 450° C. to 900° C., preferably 600° C. to 850° C., and the total burning period is 2 to 20 hours, preferably 3 to 15 hours.

3. Treatment with Aqueous Solution of Organic Metal Salt and Soluble Aluminum Salt The positive electrode active material used in the present invention is obtained by treating the above produced lithium metal composite oxide with an aqueous solution of an organic metal sat and preferably also a soluble aluminum salt or by treating the above produced lithium metal composite oxide with an aqueous solution of a thiosulfate. The "organic metal salt" used in the present invention refers to a water soluble salt between an organic acid and metal. While not particularly limited thereto, exemplary organic metal salts to be used include lithium acetate, sodium acetate, potassium acetate, magnesium acetate, calcium acetate, ammonium acetate, aluminum acetate, sodium sorbate, potassium sorbate, calcium sorbate, 2-ethyl sodium hexanoate, 2-ethyl potassium hexanoate, 2-ethyl calcium hexanoate, 2-ethyl cobalt hexanoate, 2-ethyl manganese hexanoate, lithium butyrate, sodium butyrate, potassium butyrate, magnesium butyrate, calcium butyrate, ammonium butyrate, lithium benzoate, sodium benzoate, potassium benzoate, magnesium benzoate, calcium benzoate, ammonium benzoate, aluminum benzoate, sodium para-toluenesulphonate, potassium para-toluenesulphonate, sodium dodecyl sulfate, etc. Among these, sodium dodecyl sulfate is most preferably used.

The "soluble aluminum salt" in the present invention is not particularly limited as long as it is a salt of aluminum soluble in water, with aluminum sulfate, aluminum nitrate, aluminum chloride, sodium aluminate, potassium aluminate, etc. preferably used. Among these, aluminum sulfate is most preferably used.

The "thiosulfate" used in the present invention refers to a water soluble salt between a thiosulfuric acid and metal, with exemplary thiosulfates to be used including sodium thiosulfate, potassium thiosulfate, etc. Among these, sodium thiosulfate is most preferably used.

The treatment with the aqueous solution (hereinafter, abbreviated as a salt aqueous solution) is carried out by bringing a salt aqueous solution into contact with the lithium metal composite oxide produced via the abovementioned step and drying it.

Specific examples of the contact method to be used include: a method involving adding a lithium metal composite oxide to a salt aqueous solution, and stirring it; a method involving forming a lithium metal composite oxide layer on a filter material, pouring a salt aqueous solution thereon for contacting; etc., with contact by stirring preferably used.

Specific examples of the drying method include: a method involving separating a slurry including the salt aqueous solution and the lithium metal composite oxide by a known method such as filtration or decantation, then drying it by a known method such as vacuum drying, hot air drying, and drying with an electric furnace; a method involving evaporating, drying, and solidifying a slurry including the salt aqueous solution and the lithium metal composite oxide without separating the liquid and solid thereof; etc., with drying with an electric furnace preferably used. The drying temperature is preferably 200° C. to 800° C., more preferably 300° C. to 700° C., further preferably 400° C. to 600° C. The drying atmosphere can be vacuum drying, drying in air, or drying in an oxidizing gas atmosphere, with drying in an oxidizing gas atmosphere preferable.

While not particularly limited thereto, the concentration of the aqueous solution of a thiosulfate is preferably higher than 0.5 wt. % and 20 wt. % or lower, more preferably higher than 1 wt. % and 20 wt. % or lower, particularly preferably higher than 1 wt. % and 10 wt. % or lower. Regarding the weight ratio of the lithium metal composite oxide to the aqueous solution of a thiosulfate, the aqueous solution of a thiosulfate per 10 parts by weight of the lithium metal composite oxide is 2 parts by weight or higher and lower than 30 parts by weight, preferably 3 parts by weight or higher and lower than 20 parts by weight, more preferably 5 parts by weight or higher and lower than 15 parts by weight, particularly preferably 6 parts by weight or higher and lower than 13 parts by weight.

The concentration of each of the organic metal salt and the soluble aluminum salt in the salt aqueous solution is not particularly limited. The concentration of the organic metal salt is preferably higher than 0.5 wt. % and 20 wt. % or lower, more preferably higher than 1 wt. % and 20 wt. % or lower, particularly preferably higher than 1 wt. % and 10 wt. % or lower. The concentration of the soluble aluminum salt is preferably higher than 0.5 wt. % and 20 wt. % or lower, more preferably higher than 1 wt. % and 20 wt. % or lower, particularly preferably higher than 1 wt. % and 10 wt. % or lower.

Regarding the weight ratio of the lithium metal composite oxide to the salt aqueous solution, the salt aqueous solution per 10 parts by weight of the lithium metal composite oxide is 2 parts by weight or higher and lower than 30 parts by weight, preferably 3 parts by weight or higher and lower than 20 parts by weight.

The remaining LiOH contained in the lithium metal composite oxide powder for use in a positive electrode active material for a lithium ion battery according to the present invention is reduced to 0.5 wt. % or lower.

It has been found that the treatment with the salt aqueous solution according to the present invention can suppress alkaline materials remaining on the surface of the positive electrode active material and presumably serving as a causative material of gas generation without excessively removing it, and unexpectedly, this treatment suppresses gas generation associated with charging and discharging, in addition to contributing to an increase in the discharge capacity along with improved cycle characteristics. While alkaline materials remaining on the surface of a positive electrode material active material are generally reduced by washing treatment using pure water, the treatment with the mentioned aqueous solution in the present invention can be a treatment under more moderate conditions than simple washing treatment, with damage to the active material capable of being reduced. This is presumably because, in a case where pure water is used for washing, lithium ions present in crystals of the positive electrode active material are exchanged with hydrogen ions and the destruction of a layered crystal structure associated with dehydration in the subsequent drying step deteriorates the battery performance, while in the treatment with the salt aqueous solution, ions contained in the aqueous solution suppress the exchange of lithium ions and hydrogen ions contained in the crystals of the lithium metal composite oxide, in addition to suppressing the destruction of the crystal structure. This is also presumably because, in a case where the soluble aluminum sat is added to the organic metal sat in the treatment with the salt aqueous solution in the present invention, aluminum ions are uniformly dispersed on the surface of the lithium metal composite oxide, and part of a transition metal layer in the crystals of the lithium metal composite oxide is substituted with aluminum to obtain the pillar effect and stabilize the crystal structure of the lithium metal composite oxide. Further, this presumably contributes to the stabilization of the crystal structure in repeated charging and discharging, and it is expected that it simultaneously contributes to a reduction in oxidation reaction points on the surface of the lithium metal composite oxide resulting in the oxidative destruction of an electrolytic solution.

In the lithium metal composite oxide powder for use in the positive electrode active material for a lithium ion battery according to the present invention, the treatment with the mentioned aqueous solution suppresses the influence of side effects and removes excessive alkaline material from at least the surface thereof at an appropriate level. Such a lithium metal composite oxide powder for use in the positive electrode active material for a lithium ion battery according to the present invention exhibits remarkably excellent performance as a positive electrode active material compared with conventional products when new. However, it is difficult at the current technical level to represent how the chemical or physical characteristics of the lithium metal composite oxide powder change due to the treatment of the salt aqueous solution using an absolute or general index (for example, observation results using a variety of versatile analysis equipment).

Lithium Ion Battery Positive Electrode Active Material

Powder containing particles of the obtained lithium metal composite oxide can be used alone as the positive electrode active material of the lithium ion battery. Alternatively, other positive electrode active materials for a lithium ion battery may be mixed and used as the positive electrode active material. Moreover, multiple kinds lithium metal oxide powder having different particle diameters and compositions may be produced by the production method of the present invention to use a mixture thereof as the positive electrode active material.

In a case where the lithium metal composite oxide powder for use in a positive electrode active material for a lithium ion battery according to the present invention is used as the positive electrode active material, gas generation is suppressed upon use in laminate batteries, while favorable initial discharge capacity and cycle retention rate are achieved in coin batteries.

The characteristics regarding the suppression of the abovementioned gas generation are defined such that laminate batteries obtained by the following production method (1) using the lithium metal composite oxide powder as a positive electrode active material have a gas generation amount measured under a condition (2) below of less than 1.0 mL/g, (1) a method for producing a laminate battery, wherein a mixture containing 1 part by weight of acetylene black, 5 parts by weight of graphite carbon, and 4 parts by weight of polyvinylidene fluoride per 100 parts by weight of the lithium metal composite oxide powder is dispersed in N-methyl pyrrolidone, which is a dispersion solvent, to prepare a positive electrode agent slurry, the positive electrode agent slurry thereof is then coated onto an aluminum foil, which is a current collector, then dried and pressed to produce a positive electrode, 98 parts by weight of artificial graphite, 1 part by weight of carboxymethyl cellulose as a binder, and 1 part by weight of a styrene butadiene copolymer are mixed with water as a dispersion medium to obtain a negative electrode mixed agent, the negative electrode mixed agent is then coated onto a copper foil, which is a current collector, and dried to produce a negative electrode, ethylene carbonate (EC) in which $LiPF_6$ is dissolved at a concentration of 1 moVL, ethyl methyl carbonate (EMC), and vinyl carbonate (VC) are mixed to a weight ratio (EC:EMC:VC) of 50:50:1, thereby producing an electrolytic solution, and the abovementioned positive electrode, negative electrode, and electrolytic solution are laminated and sealed to produce a laminate battery; and (2) a method for measuring the gas generation amount, wherein the laminate battery is charged to 4.2 V at a rate of 0.1 C, after which the volume ($V_0$) (mL) thereof is measured using the Archimedes method, the laminate battery is then stored in a thermostatic tank for 72 hours at 85° C., after which the volume ($V_{85-72}$) (mL) thereof is once again measured using the Archimedes method, and the measured volumes $V_0$ and $V_{85-72}$, as well as the weight (g) of the lithium metal composite oxide powder used in the laminate battery are then used to calculate the gas generation amount (mL/g) of the laminate battery as defined by the following equation.

$$\text{Laminate battery gas generation amount (mL/g)} = \frac{V_{85-72} - V_0}{\text{Weight (g) of the lithium metal composite oxide powder}}$$

The characteristics suitable for the abovementioned coin battery are defined such that furthermore, a coin battery obtained by the following production method (3) using the lithium metal composite oxide powder as a positive electrode active material has an initial discharge capacity measured by the following method (4) of 190 mAh/g or larger, and the cycle retention rate of the coin battery measured by the following method (5) is 95% or higher, (3) a method for producing a coin battery, wherein a mixture containing 1 part by weight of acetylene black, 5 parts by weight of graphite carbon, and 4 parts by weight of polyvinylidene fluoride per 100 parts by weight of the lithium metal composite oxide powder is dispersed in N-methyl pyrrolidone, which is a dispersion solvent, to prepare a positive electrode agent slurry, the positive electrode agent slurry thereof is then coated onto an aluminum foil, which is a current collector, then dried and pressed to produce a positive electrode, the positive electrode, a negative electrode comprising a lithium metal foil, and an electrolytic solution comprising a solution of a mixture of equal amounts of ethylene carbonate with 1 mol/L of $LiPF_6$ and ethyl methyl carbonate are used to fabricate a CR2032 type coin battery in accordance with the standards of the International Electrotechnical Commission (IEC);

(4) a method for measuring the initial discharge capacity, wherein the battery capacity of the coin battery per weight of the positive electrode active material when the battery is discharged at 0.1 C between 4.3 V and 3.0 V is measured as the initial discharge capacity (Ah/g); and (5) a method for measuring the cycle retention rate, wherein, after the initial discharge capacity is measured, the coin battery is then subjected to 50 cycles of repeated charging and discharging, with one cycle being charging of 0.5 C and discharging of 1.0 C in a 25° C. environment, and the cycle retention rate (%) of the coin battery as defined by the following equation is then determined using the battery capacity (01) (mAh/g) after completing one cycle and the battery capacity (050) (mAh/g) after completing 50 cycles per weight of the positive electrode active material.

$$\text{Coin battery cycle retention rate (\%)} = \frac{Q50}{Q1} \times 100$$

EXAMPLES

Example 1a

Production of the Precursor

A raw material solution and other reaction liquids illustrated below were prepared.

(Mixed aqueous solution) A mixed aqueous solution obtained by mixing 84 parts by weight of a nickel sulfate aqueous solution containing nickel at a concentration of 8.2 wt. %, and 16 parts by weight of a cobalt sulfate aqueous solution containing cobalt at a concentration of 8.2 wt. %

(Complexing agent) Ammonia water containing ammonia at a concentration of 25 wt. %

(Alkaline regulator) A sodium hydroxide aqueous solution containing sodium hydroxide at a concentration of 25 wt. %

Pure water

A sodium sulfate aqueous solution having a concentration of 16 wt. % was filled into a precipitation tank illustrated in FIG. 4 and the aqueous solution was circulated via the inclined plate sedimentation apparatus, while the number of stirring revolutions was retained at 800 rpm, with the temperature of the reaction liquid retained at 50° C. Each of the abovementioned mixed aqueous solution, complexing agent, and pH adjustor was separately supplied to initiate a coprecipitation reaction.

The pH of the reaction liquid was controlled within the range of 11.0 to 11.5 to promote the production reaction of the composite hydroxide. Until the solid concentration reached 200 g/L and further became stable, the mother liquid was extracted, while the slurry was extracted. After precipitation step equipment was continuously operated for 72 hours from the initiation of supplying the raw material, extraction of the slurry containing the composite hydroxide was initiated. The slurry was extracted via a pump 14. The obtained composite hydroxide slurry was filtrated and washed to obtain composite hydroxide having an average particle diameter of 5.0 μm. This was dried at 120° C. in a vacuum. A nickel-cobalt composite hydroxide powder having an average particle diameter of approximately 6 μm having a composition of $Ni_{0.86}Co_{0.14}(OH)_2$ as the precursor was thus obtained.

Burning

Aluminum hydroxide and lithium hydroxide were added and mixed into the nickel-cobalt composite hydroxide under shear force. The mixture was filled into a sagger made of ceramic for burning. In oxygen, the mixture filled into the sagger was maintained and burned at 730° C. for 4 hours, and further maintained and burned at 770° C. for 11 hours. A burned substance was crushed to obtain a lithium metal composite oxide powder having a composition of $Li_{1.005}Ni_{0.80}Co_{0.15}Al_{0.05}O_2$.

Treatment with the Aqueous Solution of an Organic Metal Salt 100 g of the abovementioned lithium metal composite oxide was immersed in 100 g of a 4 wt. % aqueous solution of sodium dodecyl sulfate (hereinafter, abbreviated as SDS), stirred for 3 minutes, subjected to suction filtration, then dried at 500° C. in oxygen. The lithium metal composite oxide thus treated with SDS according to the present invention was obtained.

Evaluation

The obtained lithium metal composite oxide was evaluated from the following perspectives. The results are shown in Table 1.

(1 Average particle diameter) The obtained lithium metal composite oxide passed through a standard sieve having a nominal opening of 53 μm regulated by JIS Z 8801-1:2006. Note that when no agglomeration of particles was observed, the oxide was directly sieved; when agglomeration of particles was observed, the oxide was crushed with a mortar and sieved. The average particle diameter (D50) of the lithium metal composite oxide particles which had passed through the sieve was measured using a laser scattering particle size distribution measuring apparatus LA-950 available from HORIBA, Ltd.

(2 Specific surface area) Approximately 10 g of the obtained lithium metal composite oxide was weighed and installed in a specific surface area measuring apparatus (NOVA4200e available from Quantachrome Instruments Japan G.K.), in addition to being deaerated at 200° C., after which the specific surface area was measured by the BET method using nitrogen absorption at the temperature of liquid nitrogen.

(3 pH) 2 g of the obtained lithium metal composite oxide was added to 100 mL of pure water at 25° C., stirred using a magnetic stirrer for 3 minutes, then subjected to suction filtration. The pH of the obtained filtrate was measured using a pH meter available from HORIBA, Ltd. The results are shown in Table 1.

(4 LiOH amount) 2 g of the obtained lithium metal composite oxide was added to 100 mL of pure water at 25° C., stirred using a magnetic stirrer for 3 minutes, then subjected to suction filtration. 10 mL of the obtained filtrate was collected with a pipet and titrated with 0.1 N hydrochloric acid to determine the quantity of the content of lithium hydroxide contained in the lithium metal composite oxide.

(5 Evaluation as the positive electrode active material for a laminate battery) Using the obtained lithium metal composite oxide as a positive electrode and material, a laminate battery was produced by the following method, after which the gas generation amount upon use of this laminate battery was evaluated.

(Production of the laminate battery) 1 part by weight acetylene black produced by Denka Company Limited, 5 parts by weight of graphite carbon produced by Nippon Kokuen Group, 4 parts by weight of polyvinylidene fluoride produced by Kureha Corporation were prepared per 100 parts by weight of the obtained lithium metal composite oxide to prepare a slurry with N-methyl pyrrolidone serving as a dispersion solvent. The slurry thereof was then coated onto an aluminum foil, which was a current collector, then dried and pressed to be used as a positive electrode. 98 parts by weight of artificial graphite (MAG-D), 1 part by weight of carboxymethyl cellulose (CMC) as a binder, and 1 part by weight of a styrene butadiene copolymer (SBR) were mixed with water as a dispersion medium to obtain a negative electrode mixed agent. The negative electrode mixed agent was then coated onto a copper foil, which was a current collector, and dried to produce a negative electrode. Ethylene carbonate (EC) in which $LiPF_6$ was dissolved at a concentration of 1 mol/L, ethyl methyl carbonate (EMC), and vinyl carbonate (VC) were mixed to a weight ratio (EC:EMC:VC) of 50:50:1, thereby producing an electrolytic solution. The abovementioned positive electrode, negative electrode, and electrolytic solution were laminated and sealed to produce a laminate battery.

(Gas generation amount measurement) The obtained laminate battery was charged to 4.2 V at a rate of 0.1 C, after which the volume ($V_0$)(mL) of the laminate battery was measured using the Archimedes method (MDS300 type available from Alfa Mirage). This laminate cell was then stored in a thermostatic tank for 72 hours at 85° C., after which the volume ($V_{85-72}$)(mL) thereof was once again measured using the Archimedes method. The gas generation amount (mL/g) corresponding to the increase in the volume of the laminate battery was calculated based on the following equation.

$$\text{Laminate battery gas generation amount (mL/g)} = \frac{V_{85-72} - V_0}{\text{Weight (g) of the lithium metal composite oxide powder}}$$

(6 Evaluation as the positive electrode active material for a coin battery) Using the obtained lithium metal composite oxide as the positive electrode active material, a coin battery was produced by the following method and the performance of this coin battery was evaluated.

(Production of the coin battery) 1 part by weight acetylene black available from Denka Company Limited, 5 parts by weight of graphite carbon available from Nippon Kokuen Group, 4 parts by weight of polyvinylidene fluoride available from Kureha Corporation were prepared per 100 parts by weight of the obtained lithium metal composite oxide to prepare a slurry with N-methyl pyrrolidone serving as a dispersion solvent. The slurry thereof was then coated onto an aluminum foil, which was a current collector, then dried and pressed to be used as a positive electrode. A lithium metal foil was used as a negative electrode. As the electrolytic solution, a solution of a mixture of equal amounts of ethylene carbonate with 1 mol/L of $LiPF_6$ and ethyl methyl carbonate was used. The abovementioned positive electrode, negative electrode, and electrolytic solution were laminated and sealed to produce a CR2032 type coin battery.

(Initial discharge capacity) The battery capacity of the coin battery per weight of the positive electrode active material when the battery was discharged at 0.1 C between 4.3 V and 3.0 V was measured as the initial discharge capacity (Ah/g).

(Cycle retention rate) After the initial discharge capacity was measured, the coin battery was then subjected to 50 cycles of repeated charging and discharging, with one cycle being charging of 0.5 C and discharging of 1.0 C. The cycle retention rate (%) of the coin battery as defined by the following equation was then determined using the battery capacity (01) (mAh/g) after completing one cycle and the battery capacity (050) (mAh/g) after completing 50 cycles per weight of the positive electrode active material.

$$\text{Coin battery cycle retention rate (\%)} = \frac{Q50}{Q1} \times 100$$

(7 Surface observation) The surface of the obtained lithium metal composite oxide was observed using an SU8020 electron microscope produced by Hitachi High-Technologies Corporation. The dispersion state of aluminum in the observed portions was observed using a V-MAX energy dispersion type X-ray analysis apparatus produced by HORIBA, Ltd. installed in the abovementioned electron microscope.

Example 2a

The organic metal salt treatment conditions of Example 1a were changed. That is, 100 g of the lithium metal composite oxide obtained by burning was immersed in 100 g of an 8 wt. % aqueous solution of SDS, stirred for 3 minutes, subjected to suction filtration, then dried at 500° C. in oxygen. The lithium metal composite oxide thus treated with SDS according to the present invention was obtained. This was evaluated as in Example 1a. The results are shown in Table 1.

Example 3a

Upon producing the positive electrode active material, the organic metal salt treatment conditions of Example 1a were changed. That is, 200 g of the lithium metal composite oxide obtained by burning was immersed in 100 g of a 4 wt. % aqueous solution of SDS, stirred for 3 minutes, subjected to suction filtration, then dried at 500° C. in oxygen. The lithium metal composite oxide thus treated with SDS according to the present invention was obtained. This was evaluated as in Example 1a. The results are shown in Table 1.

Example 4a

Production of the Precursor

Upon producing the positive electrode active material, the composition of the lithium metal composite oxide of Example 1 a was changed. A sodium sulfate aqueous solution having a concentration of 16 wt. % was filled into the precipitation tank illustrated in FIG. 4 and the aqueous solution was circulated via the inclined plate sedimentation apparatus, while the number of stirring revolutions was retained at 400 rpm, with the temperature of the reaction liquid retained at 65° C. Each of the abovementioned mixed aqueous solution, complexing agent, and pH adjustor was separately supplied to initiate a coprecipitation reaction.

The pH of the reaction liquid was controlled within the range of 11.0 to 11.5 to promote the production reaction of the composite hydroxide. Until the solid concentration reached 200 g/L and further became stable, the mother liquid was extracted, while the slurry was extracted. After precipitation step equipment was continuously operated for 72 hours from the initiation of supplying the raw material, extraction of the slurry containing the composite hydroxide was initiated. The slurry was extracted via a pump 14. The obtained composite hydroxide slurry was filtrated and washed to obtain a composite hydroxide having an average particle diameter of 5.0 μm. This was dried at 120° C. in a vacuum. A nickel-cobalt composite hydroxide powder having an average particle diameter of approximately 12 μm having a composition of $Ni_{0.86}Co_{0.14}(OH)_2$ as the precursor was thus obtained.

Burning

Aluminum hydroxide and lithium hydroxide were added and mixed into the nickel-cobalt composite hydroxide under shear force. The mixture was filled into a sagger made of ceramic for burning. In oxygen, the mixture filled in the sagger was maintained and burned at 790° C. for 5 hours. The burned substance was crushed to obtain a lithium metal composite oxide powder having a composition of $Li_{1.025}Ni_{0.83}Co_{0.15}Al_{0.02}O_2$.

Treatment with the Aqueous Solution of an Organic Metal Salt 100 g of the lithium metal composite oxide was immersed in 100 g of a 4 wt. % aqueous solution of SDS, stirred for 3 minutes, subjected to suction filtration, then dried at 500° C. in oxygen. The lithium metal composite oxide thus treated with SDS according to the present invention was obtained. This was evaluated as in Example 1a. The results are shown in Table 1.

Comparative Example 1 a

A precursor was produced and burned under the same conditions as in Example 1a, but treatment with an SDS aqueous solution was not carried out. A lithium metal composite oxide powder for comparison was thus obtained. This was evaluated as in Example 1a. The results are shown in Table 1.

Comparative Example 2a

A precursor was produced and burned under the same conditions as in Example 1, but only washing treatment was carried out instead of treatment with an SDS aqueous solution. A lithium metal composite oxide powder for comparison was thus obtained. This was evaluated as in Example 1 a. The results are shown in Table 1.

Example 1b

A Nickel cobalt hydroxide powder was prepared as in Example 1a, except that stirring was done at 400 rpm and the temperature of the reaction liquid was 65° C. The obtained hydroxide powder had an average particle diameter of approximately 12 μm.

Burning

Aluminum hydroxide and lithium hydroxide were added and mixed into the nickel-cobalt composite hydroxide under shear force. The mixture was filled into a sagger made of ceramic for burning. In oxygen, the mixture filled into the sagger was burned at 750° C. A burned substance was crushed to obtain a lithium metal composite oxide powder having a composition of $Li_{1.013}Ni_{0.844}Co_{0.121}Al_{0.035}O_2$.

Treatment with the Salt Aqueous Solution 100 g of the abovementioned lithium metal composite oxide was immersed in 100 g of an aqueous solution containing 4 wt. % of sodium dodecyl sulfate (hereinafter, abbreviated as SDS) and 0.75 wt. % of aluminum sulfate, stirred for 3 minutes, subjected to suction filtration, then dried at 500° C. in oxygen. The lithium metal composite oxide thus treated with an aqueous solution of SDS and aluminum sulfate according to the present invention was obtained. This was evaluated as in Example 1a. The results are shown in Table 2.

Example 2b

The treatment conditions with the salt aqueous solution of Example 1b were changed. That is, 100 g of the abovementioned lithium metal composite oxide was immersed in 200 g of an aqueous solution containing 2 wt. % of SDS and 0.5 wt. % of aluminum sulfate, stirred for 3 minutes, subjected to suction filtration, then dried at 500° C. in oxygen. The lithium metal composite oxide thus treated with an aqueous solution of SDS and aluminum sulfate according to the present invention was obtained. This was evaluated as in Example 1a. The results are shown in Table 2.

Example 3b

The treatment conditions with the salt aqueous solution of Example 1b were changed. That is, 100 g of the abovementioned lithium metal composite oxide was immersed in 100 g of an aqueous solution containing 4 wt. % of SDS and 1.0 wt. % of aluminum sulfate, stirred for 3 minutes, subjected to suction filtration, then dried at 500° C. in oxygen. The lithium metal composite oxide thus treated with an aqueous solution of SDS and aluminum sulfate according to the present invention was obtained. This was evaluated as in Example 1a. The results are shown in Table 2.

Example 4b

Production of the Precursor

A raw material solution and other reaction liquids illustrated below were prepared.
 (Mixed aqueous solution) A mixed aqueous solution obtained by mixing 84 parts by weight of a nickel sulfate aqueous solution containing nickel at a concentration of 8.2 wt. %, and 16 parts by weight of a cobalt sulfate aqueous solution containing cobalt at a concentration of 8.2 wt. %
 (Sodium aluminate aqueous solution) A mixed aqueous solution of sodium aluminate obtained by dissolving sodium hydroxide and sodium aluminate in heated pure water so as to have concentrations of 166.8 g/L and 8.2 g/L, respectively.
 (Complexing agent) Ammonia water containing ammonia at a concentration of 25 wt. %
 (Alkaline regulator) A sodium hydroxide aqueous solution containing sodium hydroxide at a concentration of 25 wt. %
 Pure water A sodium sulfate aqueous solution having a concentration of 16 wt. % was filled into the precipitation tank illustrated in FIG. 4 and the aqueous solution was circulated via the inclined plate sedimentation apparatus, while the number of stirring revolutions was retained at 400 rpm, with the temperature of the reaction liquid retained at 65° C. Each of the abovementioned mixed aqueous solution, sodium aluminate aqueous solution, complexing agent, pH adjustor, and pure water was separately supplied to initiate a coprecipitation reaction.

The pH of the reaction liquid was controlled within the range of 11.0 to 11.5 to promote the production reaction of the composite hydroxide. Until the solid concentration reached 200 g/L and further became stable, the mother liquid was extracted, while the slurry was extracted. After precipitation step equipment was continuously operated for 72 hours from the initiation of supplying the raw material, extraction of the slurry containing the composite hydroxide was initiated. The slurry was extracted via a pump 14. The obtained composite hydroxide slurry was filtrated and washed to obtain a composite hydroxide having an average particle diameter of 12.0 μm. This was dried at 80° C. in a vacuum. A nickel-cobalt-aluminum composite hydroxide having an average particle diameter of approximately 12 μm having a composition of $Ni_{0.862}Co_{0.123}Al_{0.015}O_2$ as the precursor was thus obtained.

Burning

Lithium hydroxide was added and mixed into the nickel-cobalt-aluminum composite hydroxide under shear force. The mixture was filled into a sagger made of ceramic for burning. In oxygen, the mixture filled in the sagger was burned at 748° C. A burned substance was crushed to obtain a lithium metal composite oxide powder having a composition of $Li_{1.000}Ni_{0.862}Co_{0.123}Al_{0.015}O_2$.

Treatment with the Salt Aqueous Solution 100 g of the abovementioned lithium metal composite oxide was immersed in 100 g of an aqueous solution containing 4 wt. % of SDS and 0.75 wt. % of aluminum sulfate, stirred for 3 minutes, subjected to suction filtration, then dried at 500° C. in oxygen. The lithium metal composite oxide thus treated with an aqueous solution of SDS and aluminum sulfate according to the present invention was obtained. This was evaluated as in Example 1 a. The results are shown in Table 2.

Comparative Example 1b

A precursor was produced and burned under the same conditions as in Example 1b, but treatment with an aqueous solution of SDS and aluminum sulfate was not carried out. A lithium metal composite oxide powder for comparison was thus obtained. This was evaluated as in Example 1 a. The results are shown in Table 2.

Comparative Example 2b

A precursor was produced and burned under the same conditions as in Example 1b, but only washing treatment was carried out instead of treatment with an aqueous solution of SDS and aluminum sulfate. A lithium metal composite oxide powder for comparison was thus obtained. This was evaluated as in Example 1a. The results are shown in Table 2.

Example 1c

A Nickel cobalt hydroxide powder was prepared as in Example 1b

Burning

Aluminum hydroxide and lithium hydroxide were added and mixed into the nickel-cobalt composite hydroxide under shear force. The mixture was filled into a sagger made of ceramic for burning. In oxygen, the mixture filled into the sagger was maintained and burned at 730° C. for 4 hours, then further maintained and burned at 770° C. for 11 hours. A burned substance was crushed to obtain a lithium metal composite oxide powder composed of $Li_{1.013}Ni_{0.844}Co_{0.121}Al_{0.035}O_2$.

Treatment with the Aqueous Solution of a Sodium Thiosulfate 50 g of the lithium metal composite oxide was immersed in 50 g of a 5 wt. % aqueous solution of a sodium thiosulfate, stirred for 5 minutes, subjected to suction filtration, dried at 100° C. for 2 hours in vacuum, then dried at 500° C. for 5 hours in oxygen. The lithium metal composite oxide thus treated with a sodium thiosulfate according to the present invention was obtained. This was evaluated as in Example 1a. The results are shown in Table 3

Example 2c

The treatment conditions with the aqueous solution of a sodium thiosulfate of Example 1c were changed. That is, 50 g of the lithium metal composite oxide obtained by burning was immersed in 50 g of a 10 wt. % aqueous solution of a sodium thiosulfate, stirred for 5 minutes, subjected to suction filtration, dried at 100° C. for 2 hours in vacuum, then dried at 500° C. for 5 hours in oxygen. The lithium metal composite oxide thus treated with a sodium thiosulfate according to the present invention was obtained. This was evaluated as in Example 1a. The results are shown in Table 3

Example 3c

The precursor of Example 1 was similarly burned by changing the production conditions thereof to obtain a lithium metal composite oxide having a composition of $Li_{1.000}Ni_{0.844}Co_{0.121}Al_{0.035}O_2$. 50 g of this lithium metal composite oxide was immersed in 50 g of a 5 wt. % aqueous solution of a sodium thiosulfate, stirred for 5 minutes, subjected to suction filtration, dried at 100° C. for 2 hours in vacuum, then dried at 500° C. for 5 hours in oxygen. The lithium metal composite oxide thus treated with a sodium thiosulfate according to the present invention was obtained. This was evaluated as in Example 1 a. The results are shown in Table 3

Example 4c

The treatment conditions with the aqueous solution of a sodium thiosulfate of Example 1 c were changed. That is, 50 g of the lithium metal composite oxide was immersed in 50 g of a 10 wt. % aqueous solution of a sodium thiosulfate, stirred for 5 minutes, subjected to suction filtration, dried at 100° C. for 2 hours in vacuum, then dried at 500° C. for 5 hours in oxygen. The lithium metal composite oxide thus treated with a sodium thiosulfate according to the present invention was obtained. This was evaluated as in Example 1 a. The results are shown in Table 3.

TABLE 1

| | Treatment with the SDS aqueous solution | | | Lithium metal composite oxide | | | | | Laminate battery performance | Coin battery performance | |
|---|---|---|---|---|---|---|---|---|---|---|---|
| | Powder | | | | | | | | | | |
| | SDS Concentration % | Weight (g)/ SDS aqueous solution amount (g) | Drying temperature (° C.) | Composition | Average particle diameter μm | Specific surface area m²/g | LiOH wt % | pH | Gas generation amount mL/g | Initial discharge capacity mAh/g | Cycle retention rate % |
| Example 1a | 4 | 100/100 | 500 | $Li_{1.005}Ni_{0.80}Co_{0.15}Al_{0.05}O_2$ | 7.1 | 0.41 | 0.10 | 11.1 | 0.2 | 190 | 97 |
| Example 2a | 8 | 100/100 | 500 | $Li_{1.005}Ni_{0.80}Co_{0.15}Al_{0.05}O_2$ | 5.8 | 0.50 | 0.28 | 11.2 | 0.6 | 190 | 98 |
| Example 3a | 4 | 200/100 | 500 | $Li_{1.005}Ni_{0.80}Co_{0.15}Al_{0.05}O_2$ | 7.2 | 0.33 | 0.18 | 11.1 | 0.6 | 190 | 96 |
| Example 4a | 4 | 100/100 | 500 | $Li_{1.025}Ni_{0.83}Co_{0.15}Al_{0.05}O_2$ | 11.4 | 0.45 | 0.17 | 11.0 | 0.6 | 198 | 94 |
| Comparative Example 1a | — | — | — | | 6.3 | 0.53 | 0.41 | 11.5 | 1.8 | 186 | 99 |
| Comparative Example 2a | 0 | 100/100 | 500 | $Li_{1.005}Ni_{0.80}Co_{0.15}Al_{0.05}O_2$ | 6.1 | 0.36 | 0.18 | 11.2 | 1.4 | 181 | 83 |

TABLE 2

| | Treatment with the salt aqueous solution | | | | |
|---|---|---|---|---|---|
| | SDS concentration wt. % | Aluminum sulfate concentration wt. % | Powder weight (g)/ salt aqueous solution amount (g) | Drying temperature (° C.) | Lithium metal composite oxide Composition |
| Example 1b | 4 | 0.75 | 100/100 | 500 | $Li_{1.013}Ni_{0.844}Co_{0.121}Al_{0.035}O_2$ |
| Example 2b | 2 | 0.50 | 100/200 | 500 | $Li_{1.013}Ni_{0.844}Co_{0.121}Al_{0.035}O_2$ |
| Example 3b | 4 | 1.00 | 100/100 | 500 | $Li_{1.013}Ni_{0.844}Co_{0.121}Al_{0.035}O_2$ |
| Example 4b | 4 | 0.75 | 100/100 | 500 | $Li_{1.000}Ni_{0.862}Co_{0.123}Al_{0.015}O_2$ |
| Comparative example 1b | — | — | — | — | $Li_{1.013}Ni_{0.844}Co_{0.121}Al_{0.035}O_2$ |
| Comparative example 2b | 0 | 0 | 100/100 | 500 | $Li_{1.013}Ni_{0.844}Co_{0.121}Al_{0.035}O_2$ |

| | Lithium metal composite oxide | | | | Laminate battery performance | Coin battery performance | |
|---|---|---|---|---|---|---|---|
| | Average particle diameter μm | Specific surface area m²/g | LiOH wt % | pH | Gas generation amount mL/g | Discharge capacity mAh/g | Cycle retention rate % |
| Example 1b | 11.2 | 0.50 | 0.22 | 11.1 | 0.5 | 195 | 97 |
| Example 2b | 11.3 | 0.43 | 0.19 | 11.1 | 0.6 | 193 | 95 |
| Example 3b | 11.4 | 0.40 | 0.23 | 11.0 | 0.9 | 192 | 97 |
| Example 4b | 12.8 | 0.36 | 0.22 | 11.2 | 0.7 | 190 | 99 |
| Comparative example 1b | 11.1 | 0.22 | 0.64 | 11.7 | 2.6 | 187 | 98 |
| Comparative example 2b | 12.9 | 0.50 | 0.15 | 11.0 | 1.6 | 209 | 73 |

TABLE 3

| | Treatment with the aqueous solution of a sodium thiosulfate | | | |
|---|---|---|---|---|
| | Concentration of the aqueous solution of a sodium thiosulfate wt. % | Powder weight (g)/ amount (g) of the aqueous solution of a sodium thiosulfate | Drying temperature (° C.) | Lithium metal composite oxide Composition |
| Example 1c | 5 | 50/50 | 100-500 | $Li_{1.013}Ni_{0.844}Co_{0.121}Al_{0.035}O_2$ |
| Example 2c | 10 | 50/50 | 100-500 | $Li_{1.013}Ni_{0.844}Co_{0.121}Al_{0.035}O_2$ |
| Example 3c | 5 | 50/50 | 100-500 | $Li_{1.000}Ni_{0.844}Co_{0.121}Al_{0.035}O_2$ |
| Example 4c | 10 | 50/50 | 100-500 | $Li_{1.000}Ni_{0.844}Co_{0.121}Al_{0.035}O_2$ |

| | Lithium metal composite oxide | | | Laminate battery performance | Coin battery performance | |
|---|---|---|---|---|---|---|
| | Average particle diameter μm | LiOH wt. % | pH | Gas generation amount mL/g | Discharge capacity mAh/g | Cycle retention rate % |
| Example 1c | 11.2 | 0.26 | 11.4 | 0.6 | 179 | 100 |
| Example 2c | 10.2 | 0.23 | 11.3 | 0.9 | 178 | 100 |
| Example 3c | 10.9 | 0.18 | 11.3 | 0.6 | 180 | 100 |
| Example 4c | 10.5 | 0.25 | 11.2 | 0.7 | 178 | 100 |

As indicated in Tables 1, 2 and 3, a lithium metal composite oxide powder treated with the aqueous solutions according to the present invention has a high initial capacity and excellent cycle characteristics, with gas generation suppressed even after storage at further higher temperatures. The lithium ion battery using such a lithium metal composite oxide powder according to the present invention as the positive electrode active material of the lithium ion battery has a large discharge capacity and excellent cycle characteristics, in addition to enabling the suppression of deformation of the battery due to gas generation.

Figure 9:
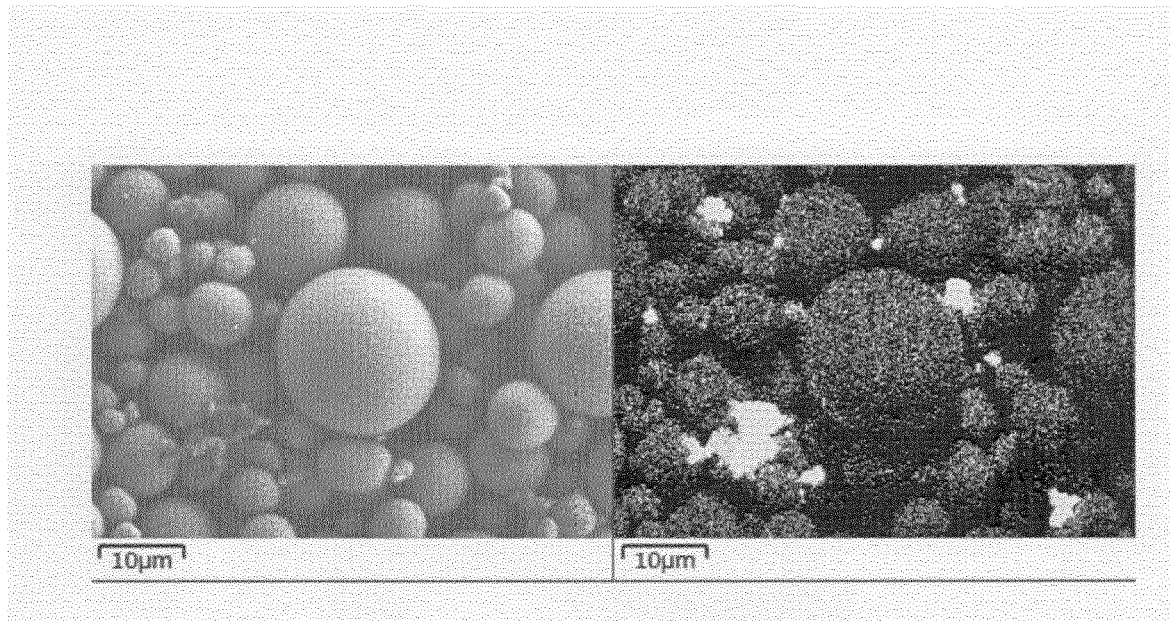
FIG. 9 is an electron microscope image (left) and aluminum energy dispersion type X-ray analysis image (right) regarding a lithium metal composite oxide powder produced in Comparative Example 1 a. Aluminum atoms are present in bright portions on the right side.
Figure 10:
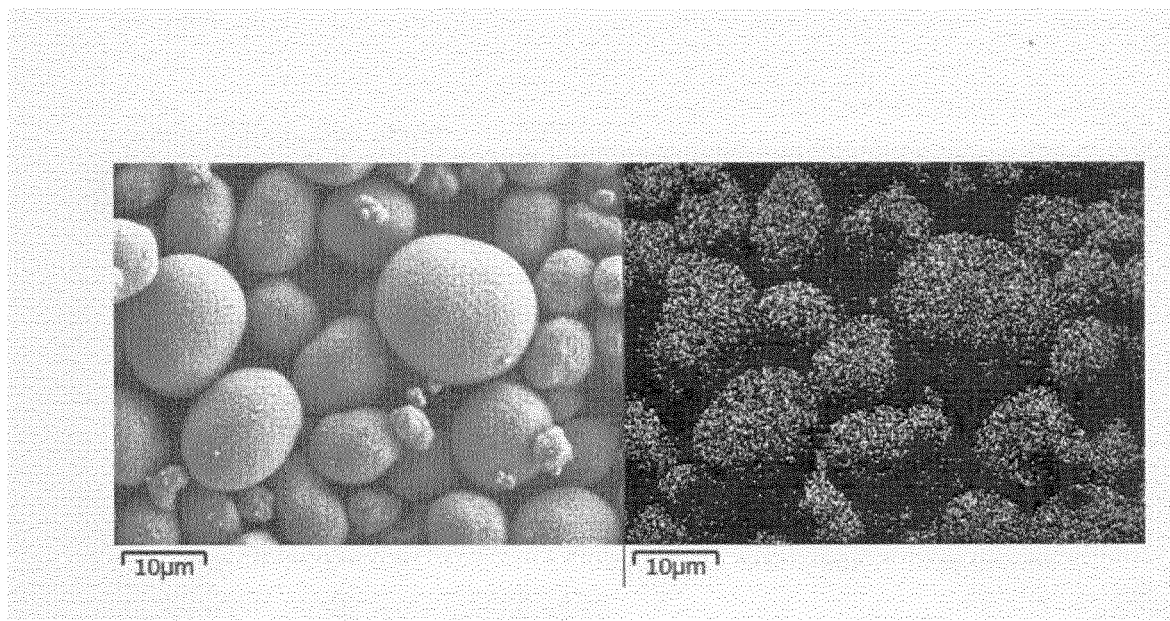
FIG. 10 is an electron microscope image (left) and aluminum energy dispersion type X-ray analysis (EDX) image (right) regarding one example (Example 1b) of a lithium metal composite oxide powder according to the present invention. Aluminum atoms are present in bright portions on the right side.
Figure 11:
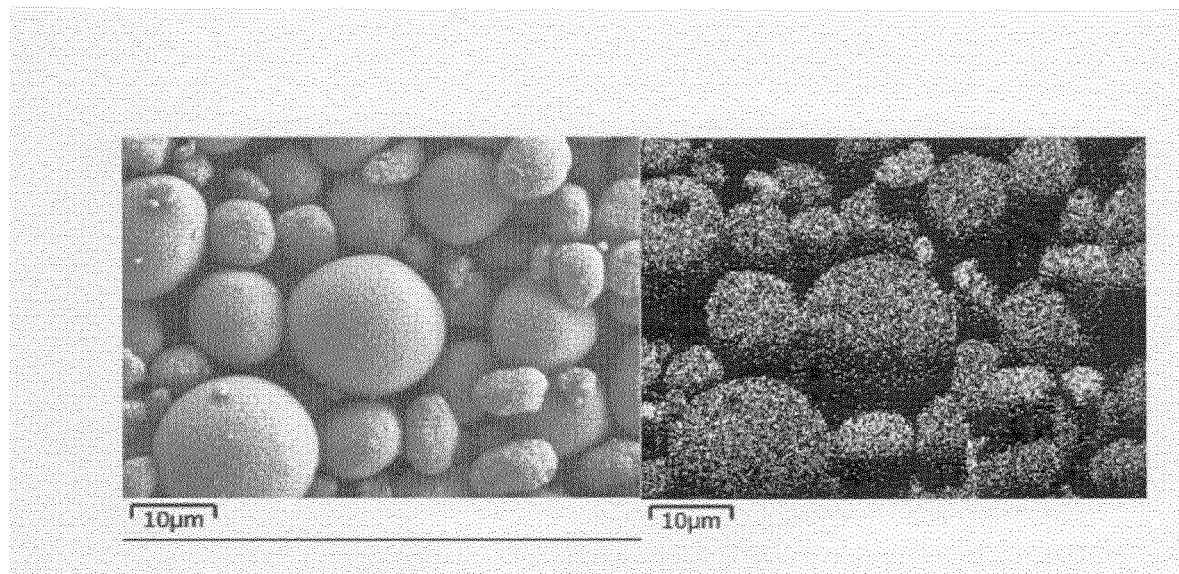
FIG. 11 is an electron microscope image (left) and aluminum energy dispersion type X-ray analysis image (right) regarding one example (Example 2b) of a lithium metal composite oxide powder according to the present invention. Aluminum atoms are present in bright portions on the right side.
Figure 12:
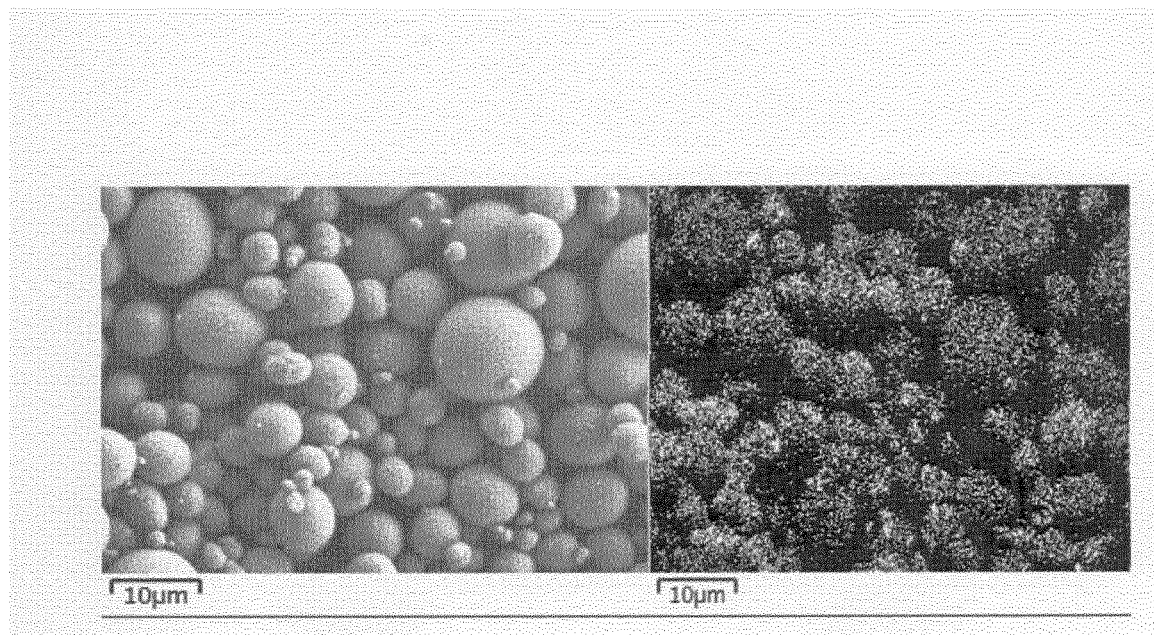
FIG. 12 is an electron microscope image (left) and aluminum energy dispersion type X-ray analysis image (right) regarding one example (Example 3b) of a lithium metal composite oxide powder according to the present invention. Aluminum atoms are present in bright portions on the right side.
Figure 13:
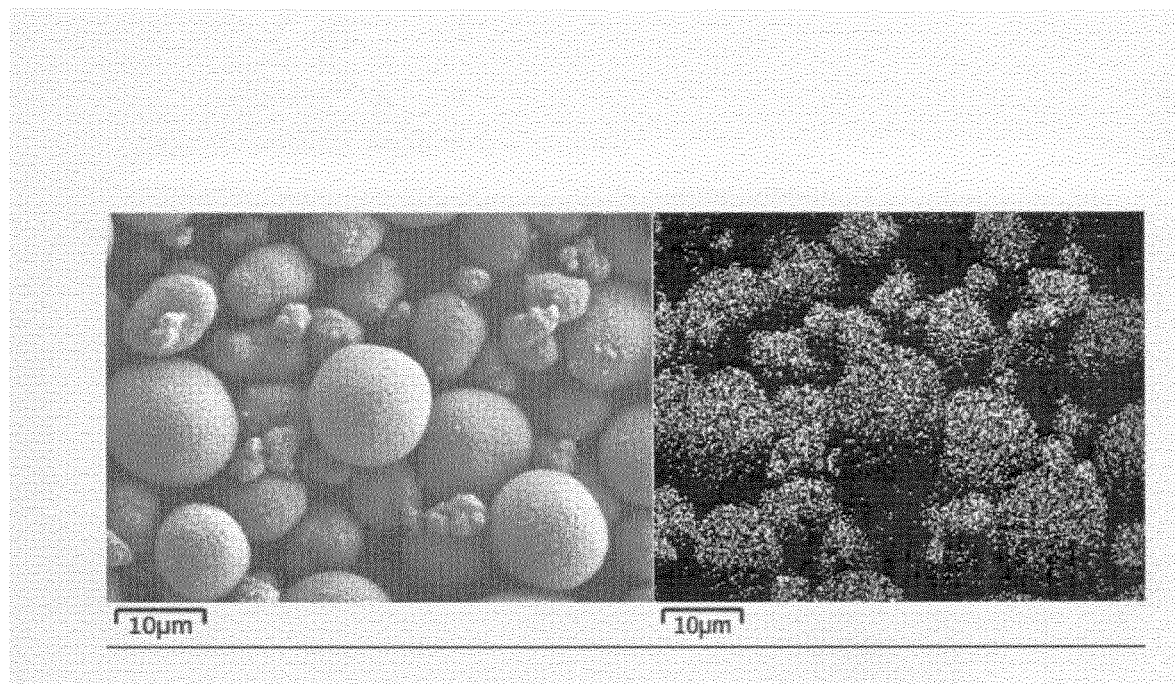
FIG. 13 is an electron microscope image (left) and aluminum energy dispersion type X-ray analysis image (right) regarding one example (Example 4b) of a lithium metal composite oxide powder according to the present invention. Aluminum atoms are present in bright portions on the right side.
Figure 14:
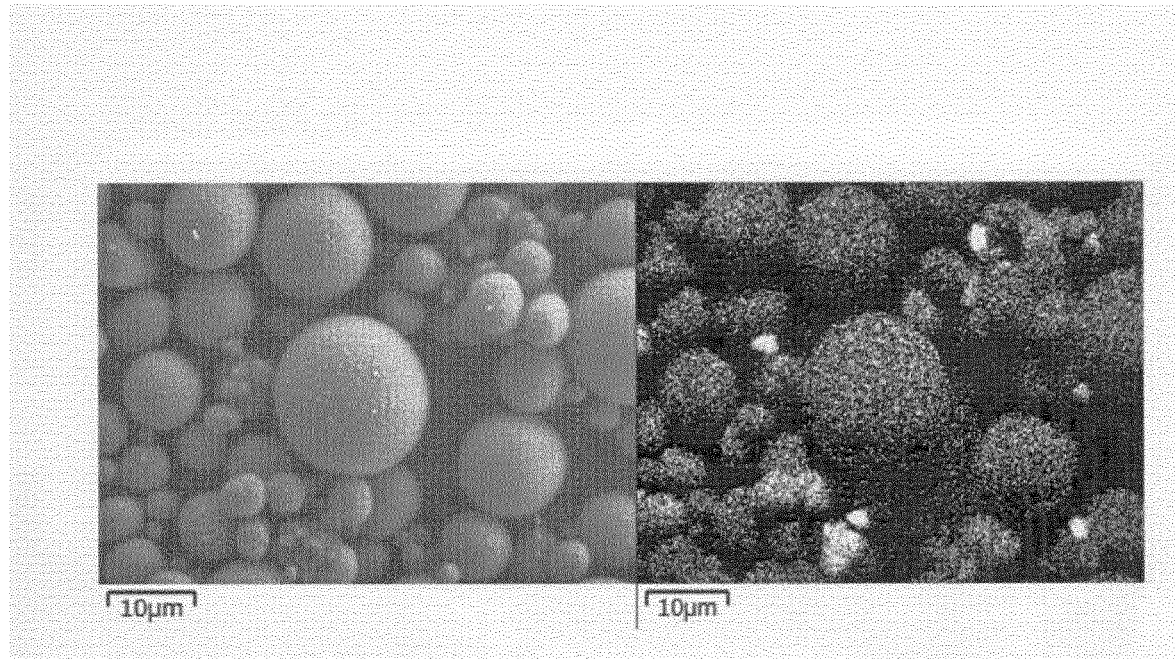
FIG. 14 is an electron microscope image (left) and aluminum energy dispersion type X-ray analysis image (right) regarding a lithium metal composite oxide powder produced in Comparative Example 1b. Aluminum atoms are present in bright portions on the right side.
Figure 15:
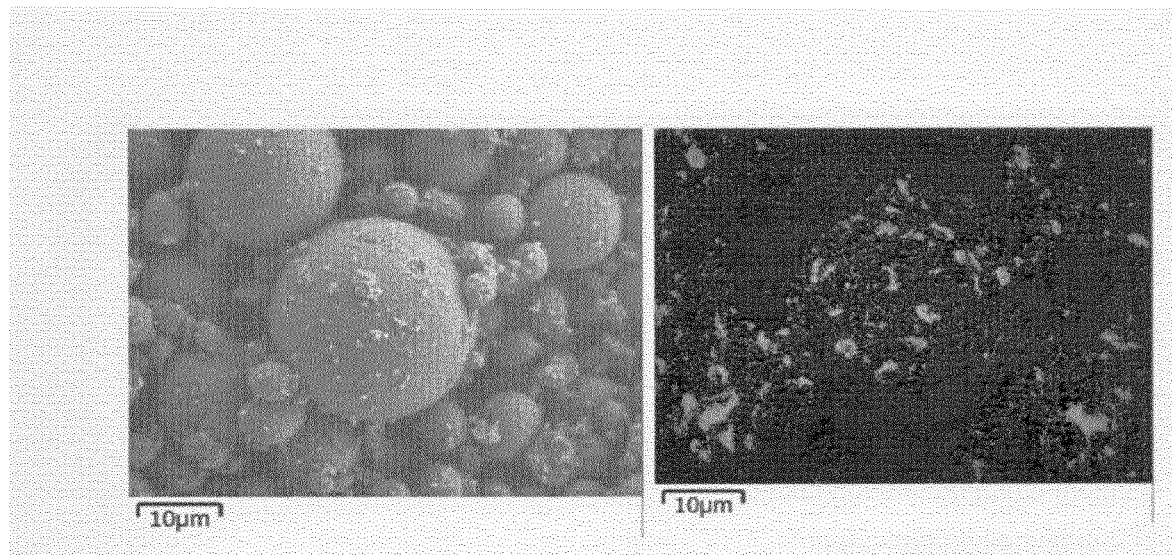
FIG. 15 is an electron microscope image (left) and sulfur energy dispersion type X-ray analysis (EDX) image (right) regarding one example (Example 1c) of a lithium metal composite oxide powder according to the present invention. Sulfur atoms are present in bright portions on the right side.
Figure 16:
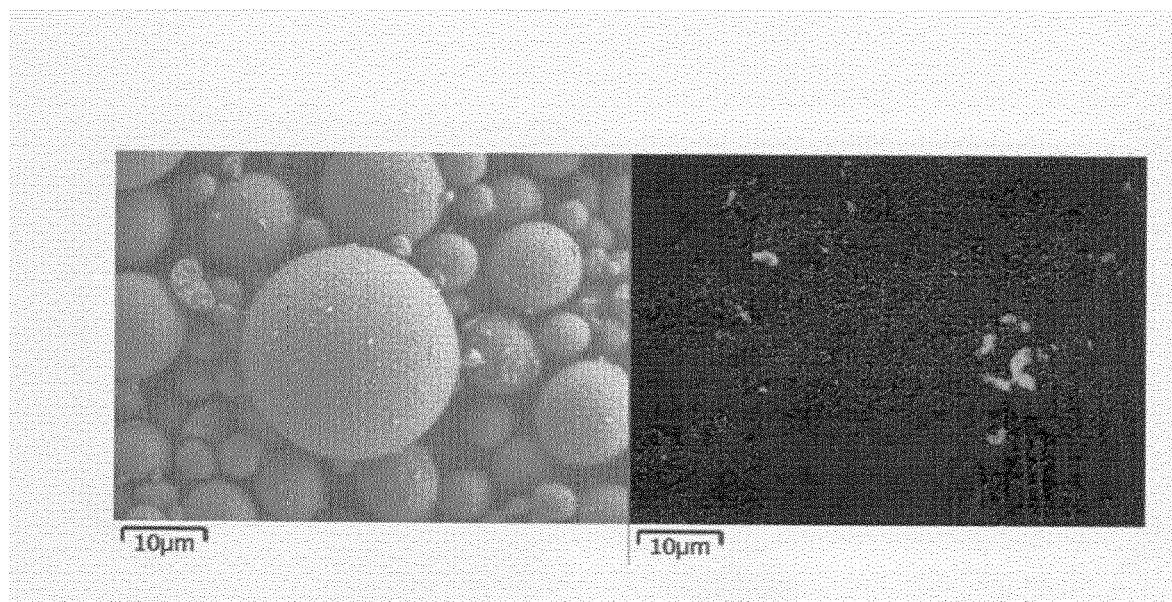
FIG. 16 is an electron microscope image (left) and sulfur energy dispersion type X-ray analysis image (right) regarding one example (Example 2c) of a lithium metal composite oxide powder according to the present invention. Sulfur atoms are present in bright portions on the right side.
Figure 17:
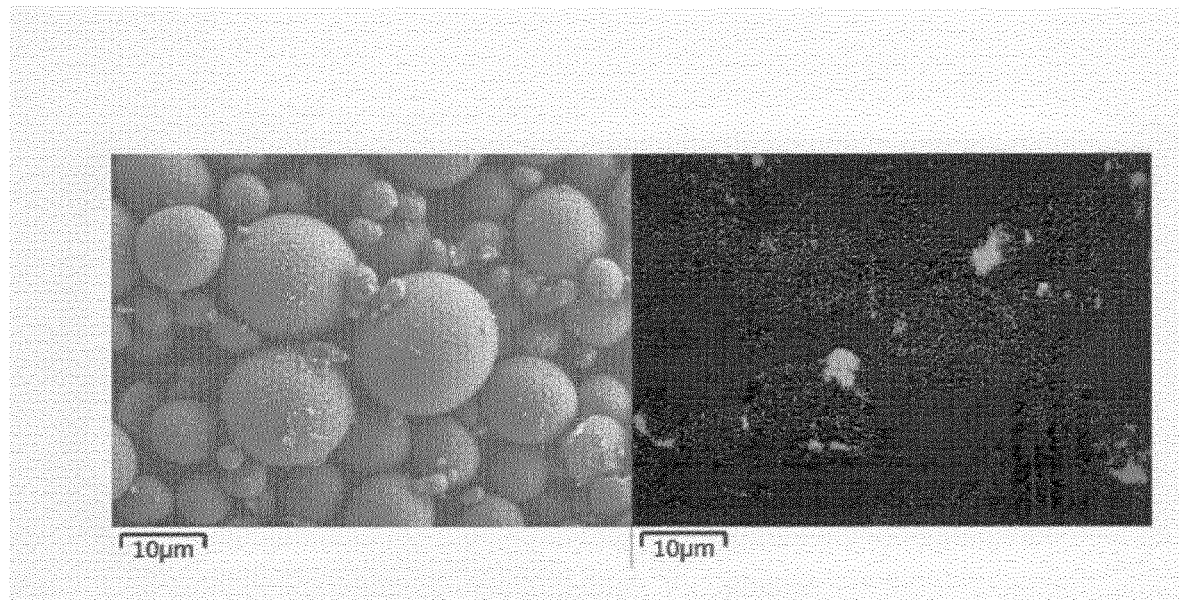
FIG. 17 is an electron microscope image (left) and sulfur energy dispersion type X-ray analysis image (right) regarding one example (Example 3c) of a lithium metal composite oxide powder according to the present invention. Sulfur atoms are present in white portions on the right side.
Figure 18:
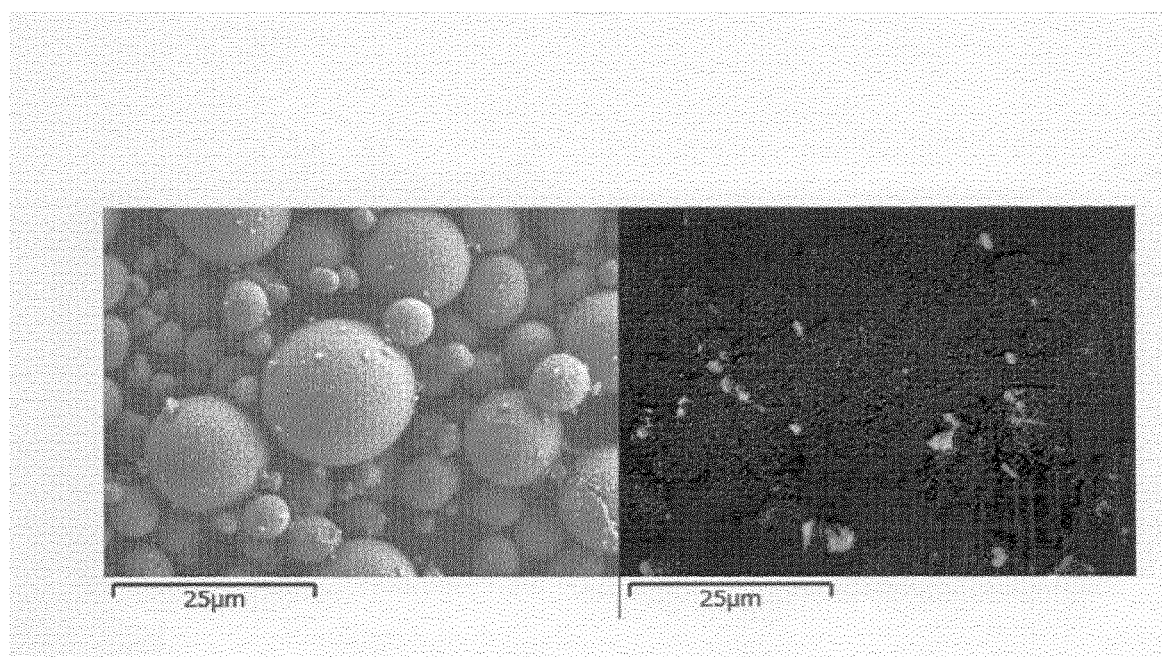
FIG. 18 is an electron microscope image (left) and sulfur energy dispersion type X-ray analysis image (right) regarding one example (Example 4c) of a lithium metal composite oxide powder according to the present invention. Sulfur atoms are present in bright portions on the right side.

Moreover, in FIG. 9, respectively FIG. 14, much aluminum not sufficiently dispersed but localized is observed on the lithium metal composite oxide powder not treated with the salt aqueous solution. In contrast, in FIGS. 5, 6, 7, and 8, respectively FIGS. 10, 11, 12, and 13, little localization of aluminum and uniform dispersion thereof can be observed in the lithium metal composite oxide powder according to the present invention treated with the salt aqueous solution. As thus described, it is presumed that treatment with the salt aqueous solution allows aluminum to be uniformly dispersed on the surface of the positive electrode active material, resulting in improved cycle characteristics of the battery.

Figure 19:
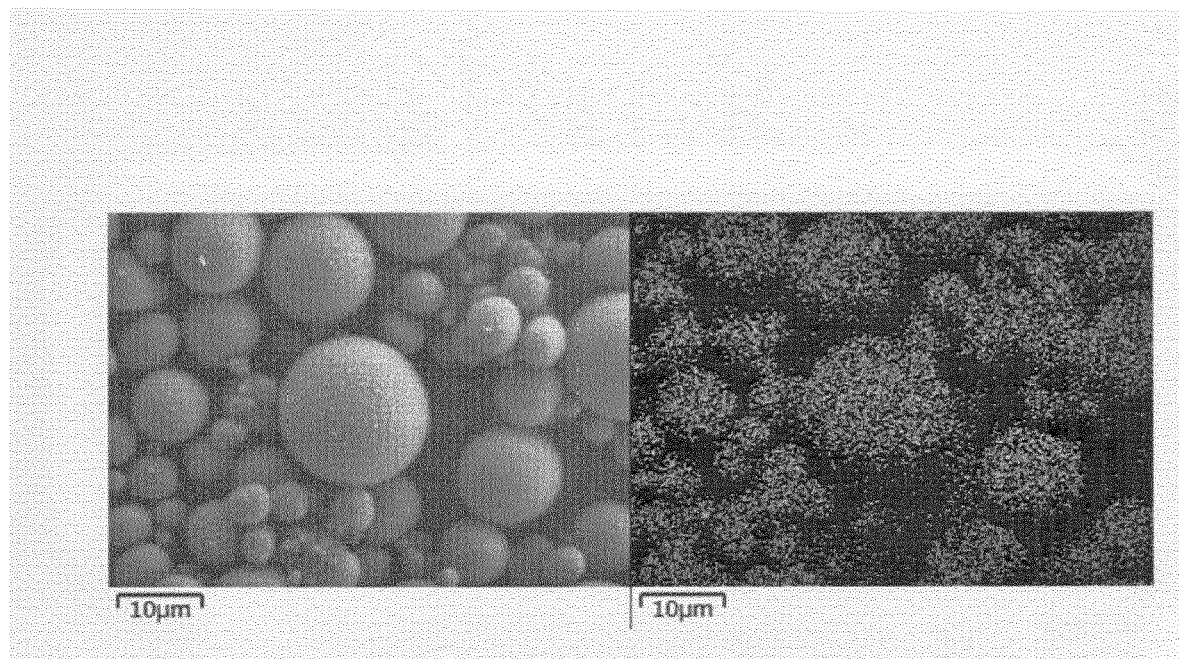
FIG. 19 is an electron microscope image (left) and sulfur energy dispersion type X-ray analysis image (right) regarding a lithium metal composite oxide powder produced in Comparative Example 1b. Sulfur atoms are present in bright portions on the right side.

Moreover, in FIGS. 15, 16, 17, and 18, the localization of sulfur can be observed on the surface of the lithium metal composite oxide powder according to the present invention. In contrast, the localization of sulfur is not observed on the surface of the lithium metal composite oxide powder for comparison illustrated in FIG. 19. Consequently, it is presumed that sulfur localized on the surface of the lithium metal composite oxide powder coats points for activating the decomposition of the electrolytic solution on the surface of the positive electrode active material, enabling the achievement of extremely excellent cycle characteristics.

INDUSTRIAL APPLICABILITY

The lithium metal composite oxide powder according to the present invention is useful as a positive electrode active material of a lithium ion battery which has a large discharge capacity, excellent cycle characteristics, and suppressed gas generation. The present invention can contribute to the production of a lithium ion battery which has a large discharge capacity, excellent cycle characteristics, and does not cause deformation of the battery.

REFERENCE NUMERALS

1 Inclined plate sedimentation apparatus
2 Lamella
3 Groove
4 Inclined plate sedimentation apparatus
5 Lamella
6 Rail system
7 Solid particles
8 Lamella
9 Straight line
10 Paddle blade
11 Heat exchanger
12 Inclined plate sedimentation apparatus
13 Reactor
14 Pump
15 Slurry flow
16 Circulation pump
17 Pump
18 Circulation container
19 Slurry flow
20 Circulation container
21 Pump
22 Pump
23 Supply pump of the metal aqueous solution
24 Supply pump of the complexing agent
25 Supply pump of the pH adjustor
26 Supply pump of pure water

The invention claimed is:
1. A lithium metal composite oxide powder for use in a positive electrode active material for a lithium ion battery, the powder having a composition of $Li_aNi_bCo_cAl_dO_2$, wherein a=0.8 to 1.2, b=0.7 to 0.95, c=0.02 to 0.2, d=0.005 to 0.1, and b+c+d=1, the powder having been treated with an aqueous solution comprising a thiosulfate.

2. A lithium ion battery having a positive electrode active material containing the lithium metal composite oxide powder according to claim 1.

3. The lithium metal composite oxide powder of claim 1, wherein during preparation, after the powder has been treated with an aqueous solution comprising a thiosulfate, it is dried at a temperature between 200° C. and 800° C.

4. The lithium metal composite oxide powder of claim 1, wherein the powder having been treated with an aqueous solution comprising a thiosulfate includes bringing the powder into contact with the aqueous solution comprising a thiosulfate and drying it, wherein drying comprises a method comprising separating a slurry including the aqueous solution comprising a thiosulfate and the lithium metal composite oxide by a method selected from the group consisting of filtration and decantation, then drying it by a method selected from the group consisting of vacuum drying, hot air drying, and drying with an electric furnace.

* * * * *